US012572271B2

(12) United States Patent
Kajiyama

(10) Patent No.: US 12,572,271 B2
(45) Date of Patent: Mar. 10, 2026

(54) INFORMATION INPUT DEVICE, INFORMATION INPUT METHOD, INFORMATION INPUT CONTROL PROGRAM, AND ELECTRONIC DEVICE

(71) Applicant: NEC Corporation, Tokyo (JP)

(72) Inventor: Kunihiro Kajiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/883,256

(22) Filed: Sep. 12, 2024

(65) Prior Publication Data

US 2025/0004635 A1      Jan. 2, 2025

Related U.S. Application Data

(63) Continuation of application No. 18/480,732, filed on Oct. 4, 2023, now Pat. No. 12,124,697, which is a
(Continued)

(30) Foreign Application Priority Data

Jan. 10, 2008      (JP) ................................. 2008-003393

(51) Int. Cl.
*G06F 3/04886* (2022.01)
*G06F 3/01* (2006.01)
(Continued)

(52) U.S. Cl.
CPC .......... *G06F 3/04886* (2013.01); *G06F 3/018* (2013.01); *G06F 3/0412* (2013.01);
(Continued)

(58) Field of Classification Search
CPC .... G06F 3/04886; G06F 3/018; G06F 3/0412; G06F 3/0488; G06F 3/0236; H04M 1/23; H04M 2250/22; H04M 2250/70
See application file for complete search history.

(56) References Cited

U.S. PATENT DOCUMENTS 5,627,980 A  *  5/1997  Schilit ................... G06F 3/0236
                                                                345/902
5,956,021 A  *  9/1999  Kubota ............... G06F 3/04886
                                                                345/173
(Continued)

FOREIGN PATENT DOCUMENTS

EP          2955620 A2      12/2015
JP          S63-278114 A      11/1988
(Continued)

OTHER PUBLICATIONS

The extended European Search Report of EP Application No. 15179982.2 dated Feb. 2, 2016. Note that EP App. No. 15179982.2 corresponds to U.S. Appl. No. 13/764,211, which is a continuation U.S. Appl. No. 12/2738872.
(Continued)

*Primary Examiner* — Benyam Ketema
(74) *Attorney, Agent, or Firm* — Sughrue Mion, PLLC

(57) ABSTRACT

The present invention provides an information input device, in which information is inputted by easy operations, even if a display unit size is limited. An information input device of the present invention has: a display unit displaying a plurality of figures; a detecting unit arranged in front of the display unit or behind the display unit, and detecting whether a physical contact from an outside exists or not and a contacted position at which the physical contact exists; and a control unit deciding a figure displayed on the display unit and a position at which the figure is displayed, and inputting information based on a signal from the detecting unit, and when the detecting unit detects the physical contact exists, the control unit determines a first figure displayed at a nearest position to the contacted position in the plurality of figures based on the contacted position and decides a second
(Continued)

| | | | | |
|---|---|---|---|---|
| | あ | か | さ | |
| | た | な | は | |
| | ま | や | ら | |
| | | わ | | |
| | | | | |

| | え | | | |
|---|---|---|---|---|
| う | あ | お | | |
| | い | | | |
| | | | | |
| | | | | | figure displayed at a position surrounding the contacted position based on a kind of the first figure.

17 Claims, 23 Drawing Sheets

Related U.S. Application Data continuation of application No. 16/900,033, filed on Jun. 12, 2020, now abandoned, which is a continuation of application No. 15/144,986, filed on May 3, 2016, now Pat. No. 10,684,775, which is a continuation of application No. 13/764,211, filed on Feb. 11, 2013, now Pat. No. 9,348,503, which is a continuation of application No. 12/738,872, filed as application No. PCT/JP2009/050406 on Jan. 7, 2009, now Pat. No. 9,354,802.

(51) Int. Cl.

| | | |
|---|---|---|
| *G06F 3/023* | (2006.01) | |
| *G06F 3/041* | (2006.01) | |
| *G06F 3/0488* | (2022.01) | |
| *H04M 1/23* | (2006.01) | |

(52) U.S. Cl.
CPC ............ *G06F 3/0488* (2013.01); *H04M 1/23* (2013.01); *G06F 3/0236* (2013.01); *H04M 2250/22* (2013.01); *H04M 2250/70* (2013.01)

(56) References Cited

U.S. PATENT DOCUMENTS

| | | | | |
|---|---|---|---|---|
| 6,073,036 | A | 6/2000 | Heikkinen | G06F 3/04842 455/568 |
| 6,169,538 | B1* | 1/2001 | Nowlan | G06F 3/0233 345/173 |
| 6,271,835 | B1* | 8/2001 | Hoeksma | G06F 3/0236 345/169 |
| 6,307,541 | B1* | 10/2001 | Ho | G06F 3/0236 715/263 |
| 6,636,162 | B1* | 10/2003 | Kushler | G06F 3/018 341/28 |
| 6,639,586 | B2* | 10/2003 | Gerpheide | G06F 3/04886 345/173 |
| 6,741,235 | B1* | 5/2004 | Goren | G06F 3/04886 345/169 |
| 6,812,940 | B2* | 11/2004 | Arnold | H04M 1/23 345/161 |
| 6,980,200 | B2* | 12/2005 | Goren | G06F 3/04886 345/169 |
| 7,190,351 | B1* | 3/2007 | Goren | G06F 1/1626 345/173 |
| 7,190,531 | B2 | 3/2007 | Dyson et al. | |
| 7,230,607 | B2 | 6/2007 | Ono | |
| 7,424,683 | B2 | 9/2008 | Van | |
| 7,453,439 | B1 | 11/2008 | Kushler et al. | |
| 7,530,031 | B2* | 5/2009 | Iwamura | G06F 3/0236 715/780 |
| 7,707,515 | B2* | 4/2010 | Mistry | G06F 3/0236 715/810 |
| 8,422,661 | B2* | 4/2013 | Suzuki | G06F 3/03547 345/169 |
| 8,949,743 | B2* | 2/2015 | Kida | G06F 3/0234 715/835 |
| 9,244,878 | B2* | 1/2016 | Takei | G06F 3/0237 |
| 10,884,619 | B2* | 1/2021 | Kim | G06F 3/04892 |
| 2002/0000978 | A1* | 1/2002 | Gerpheide | G06F 3/03547 345/173 |
| 2002/0054153 | A1* | 5/2002 | Arnold | G06F 3/0236 715/810 |
| 2003/0017873 | A1 | 1/2003 | Ohara et al. | |

| | | | | |
|---|---|---|---|---|
| 2003/0122785 | A1* | 7/2003 | Jayachandra | G06F 3/018 345/171 |
| 2003/0189553 | A1* | 10/2003 | Goren | G06F 3/04886 345/173 |
| 2004/0160419 | A1 | 8/2004 | Padgitt | G06F 3/04842 345/173 |
| 2004/0164951 | A1* | 8/2004 | Lun Pun | G06F 3/0233 345/156 |
| 2004/0201576 | A1* | 10/2004 | Shimada | G06F 3/0236 345/173 |
| 2005/0066291 | A1 | 3/2005 | Lewak | |
| 2005/0219218 | A1* | 10/2005 | Harman | G06F 3/018 345/169 |
| 2006/0053387 | A1 | 3/2006 | Ording | |
| 2006/0095844 | A1* | 5/2006 | Van Leeuwen | G06F 3/0482 715/700 |
| 2006/0161846 | A1 | 7/2006 | Van | |
| 2007/0002160 | A1 | 1/2007 | Amineh | H04M 1/27475 345/173 |
| 2007/0046641 | A1 | 3/2007 | Lim | |
| 2007/0052682 | A1* | 3/2007 | Kang | G06F 3/04886 345/173 |
| 2007/0054719 | A1 | 3/2007 | Ohara et al. | |
| 2007/0115146 | A1 | 5/2007 | Jo | |
| 2007/0139382 | A1 | 6/2007 | Kotipalli | |
| 2007/0174771 | A1* | 7/2007 | Mistry | G06F 3/018 715/703 |
| 2007/0216659 | A1* | 9/2007 | Amineh | H04M 1/27475 345/173 |
| 2007/0242041 | A1 | 10/2007 | Kuroume et al. | |
| 2007/0256029 | A1 | 11/2007 | Maxwell | |
| 2007/0279255 | A1 | 12/2007 | Danish | |
| 2009/0026666 | A1 | 1/2009 | Kida | G08F 3/04886 715/663 |
| 2009/0037837 | A1 | 2/2009 | Raghunath | G06F 3/0237 715/773 |
| 2009/0079702 | A1 | 3/2009 | Colley | |
| 2009/0225041 | A1 | 9/2009 | Kida | G06F 3/0237 345/173 |
| 2009/0265669 | A1* | 10/2009 | Kida | G06F 3/04886 715/863 |
| 2010/0180235 | A1 | 7/2010 | Griffin et al. | |
| 2010/0293497 | A1 | 11/2010 | Peterson | |
| 2012/0075194 | A1 | 3/2012 | Ferren | |
| 2012/0200508 | A1* | 8/2012 | Merrett | G06F 3/04886 345/173 |
| 2013/0057478 | A1* | 3/2013 | Rahmato | G06F 3/0216 345/171 |
| 2013/0174091 | A1* | 7/2013 | Park | G06F 3/04817 715/811 |
| 2014/0115538 | A1* | 4/2014 | Kim | G06F 3/0482 715/825 |
| 2016/0005330 | A1* | 1/2016 | Tugendhat | G06F 3/018 434/157 |
| 2017/0228152 | A1* | 8/2017 | Kim | G06F 3/0482 |

FOREIGN PATENT DOCUMENTS

| | | | |
|---|---|---|---|
| JP | H06-202784 | A | 7/1994 |
| JP | H09-081320 | A | 3/1997 |
| JP | 2000-112636 | A | 4/2000 |
| JP | 2000-148366 | A | 5/2000 |
| JP | 2000-181608 | A | 6/2000 |
| JP | 2000-285080 | A | 10/2000 |
| JP | 2001-051778 | A | 2/2001 |
| JP | 2001-265503 | A | 9/2001 |
| JP | 2002-091676 | A | 3/2002 |
| JP | 2002-222053 | A | 8/2002 |
| JP | 2002-251250 | A | 9/2002 |
| JP | 2002-325965 | A | 11/2002 |
| JP | 2003-085959 | A | 3/2003 |
| JP | 2003-157144 | A | 5/2003 |
| JP | 2004-280531 | A | 10/2004 |
| JP | 2005-003218 | A | 1/2005 |
| JP | 2005-092441 | A | 4/2005 |
| JP | 2005-182487 | A | 7/2005 |
| JP | 2005-258653 | A | 9/2005 |

(56) References Cited

FOREIGN PATENT DOCUMENTS

| JP | 2005-535975 A | 11/2005 |
|----|---------------|---------|
| JP | 2006-103364 A | 4/2006 |
| JP | 2006-178755 A | 7/2006 |
| JP | 2006-209418 A | 8/2006 |
| JP | 2006-293797 A | 10/2006 |
| JP | 2006-338410 A | 12/2006 |
| JP | 2007-514363 A | 5/2007 |
| JP | 2007-156778 A | 6/2007 |
| JP | 2007-249643 A | 9/2007 |
| JP | 2007-316760 A | 12/2007 |
| JP | 2008-152441 A | 7/2008 |
| JP | 2008-204260 A | 9/2008 |
| JP | 2009-080664 A | 4/2009 |
| JP | 2009-169456 A | 7/2009 |
| JP | 2009-266236 A | 11/2009 |
| WO | 2007/070223 A1 | 6/2007 |

OTHER PUBLICATIONS

Japanese Office Action for JP2012-107948 mailed on Apr. 2, 2013 with Partial English Translation.

Japanese Office Action for JP2012-107950 mailed on Apr. 2, 2013 with Partial English Translation.

Japanese Office Action for JP Application No. 2012-107948 mailed on Aug. 19, 2014 with English Translation.

Japanese Office Action for JP Application No. 2012-107950 mailed on Aug. 19, 2014 with English Translation.

Japanese Office Action for JP Application No. 2013-3393 mailed on Jan. 21, 2014 with English Translation.

Japanese Office Action for JP Application No. 2012-107948 mailed on Jan. 28, 2014 with English Translation.

Japanese Office Action for JP Application No. 2012-107950 mailed on Jan. 28, 2014 with English Translation.

Japanese Office Action for JP2012-107949 mailed on Jan. 8, 2013.

European search report for EP09700559.9 mailed on Oct. 1, 2012.

Chinese Office Action for CN200980102059.9 mailed on Aug. 16, 2012.

Japanese Office Action for JP2008-003393 malled on Jul. 31, 2012.

Japanese Office Action for JP2008-003393 issued Mar. 13, 2012.

Chinese Office Action for CN200980102059.9 issued Nov. 24, 2011.

International Search Report for PCT/JP2009/050406 mailed Apr. 7, 2009.

Japanese Office Action for JP Application No. 2014-234218 mailed on Jun. 21, 2016 with English Translation.

Chinese Office Action for CN Application No. 201410478055.3 issued on Oct. 8, 2016 with English Translation.

Japanese Office Action for JP Application No. 2014-234218 mailed on Jan. 10, 2017 with English Translation.

Japanese Office Action for JP Application No. 2017-018143 mailed on Feb. 20, 2018 with English Translation.

Japanese Office Action for JP Application No. 2018-052221 mailed on Dec. 25, 2018 with English Translation.

Japanese Office Action for JP Application No. 2019-088364 mailed on Jan. 28, 2020 with English Translation.

Japanese Office Action for JP Application No. 2020-092823 mailed on Apr. 6, 2021 with English Translation.

Japanese Office Communication for JP Application No. 2021-214604 mailed on Dec. 13, 2022 with English Translation.

European Office Communication for EP Application No. 19166730.2 mailed on Feb. 4, 2021.

Anonymous: "Fitts's Law", Feb. 17, 2006 (Feb. 17, 2006), XP055769050, Retrieved from the Internet: URL:https://en.wikipedia.org/w/index.php? title=Fitts%27s_law&oldid=40078951 [retrieved on Jan. 26, 2021].

Japanese Office Action for JP Application No. 2023-002521 mailed on Dec. 19, 2023 with English Translation.

JP Office Action for JP Application No. 2023-002521, mailed on May 7, 2025 with English Translation.

* cited by examiner

Fig. 7A
Fig. 7B
Fig. 7C
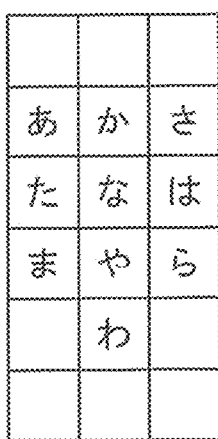
Fig. 8A
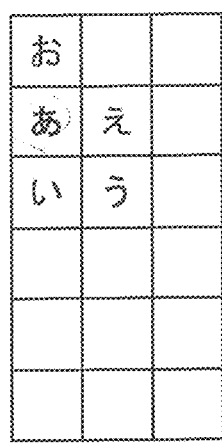
Fig. 8B
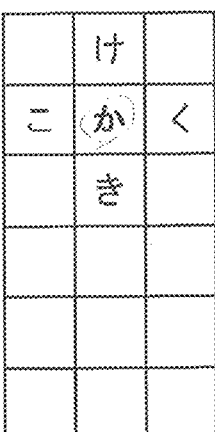
Fig. 8C

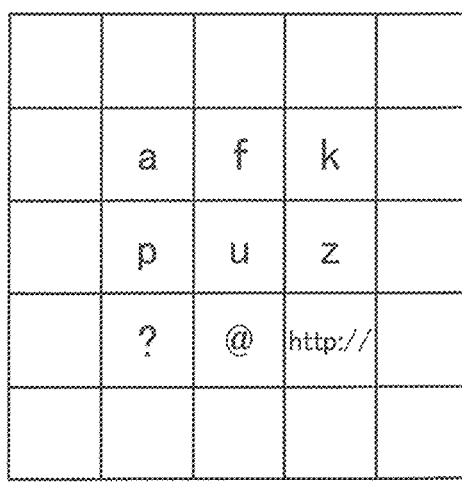
Fig. 13A
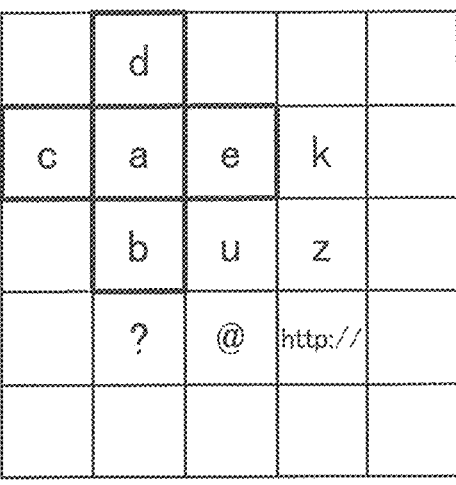
Fig. 13B
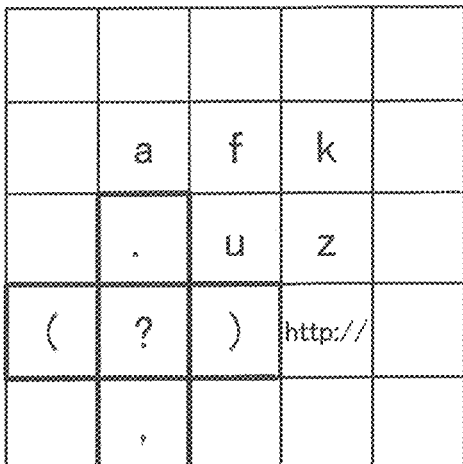
Fig. 13C
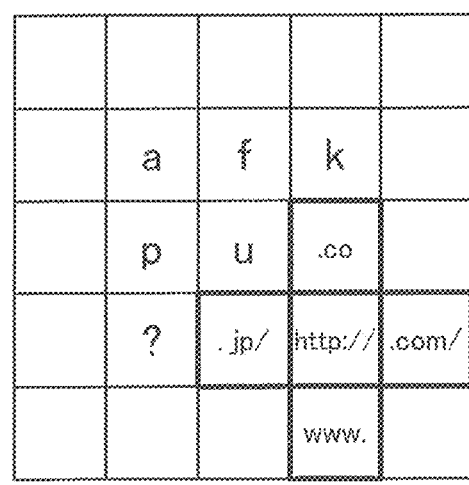
Fig. 13D                        Fig. 13E

| a | f | k |
|---|---|---|
| p | u | z |
| ? | @ | http:// |
Fig. 15A
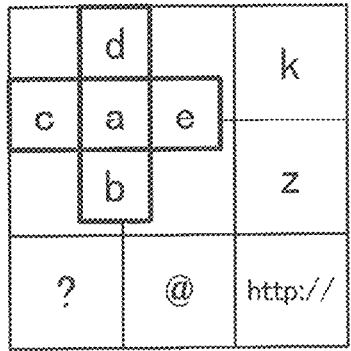
Fig. 15B
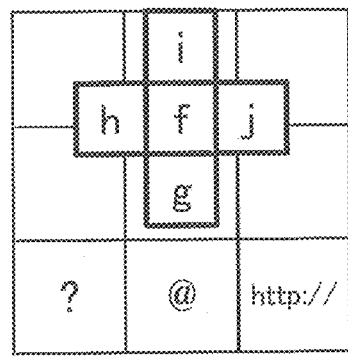
Fig. 15C
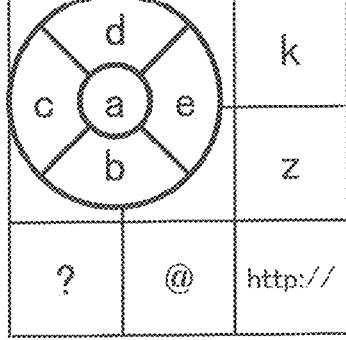
Fig. 15D
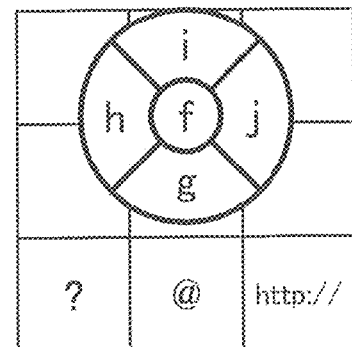
Fig. 15E

| | a | d | g | |
|---|---|---|---|---|
| | j | m | p | |
| | s | v | y | |

| B | A | C | | |
|---|---|---|---|---|
| b | a | c | g | |
| at | ar | and | p | |
| | s | v | y | |

| | a | d | g | |
|---|---|---|---|---|
| T | S | U | p | |
| t | s | u | y | |
| th | sh | ur | | |

Fig. 24

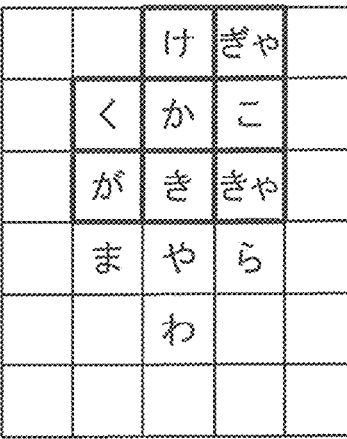
Fig. 26A
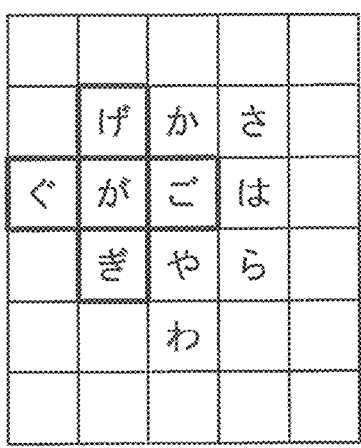
Fig. 26B
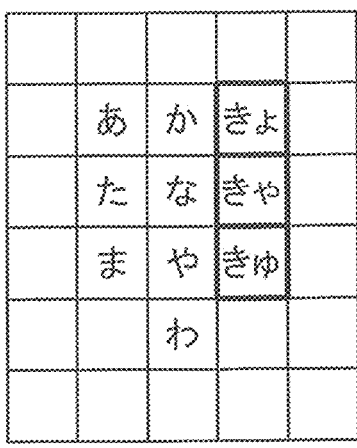
Fig. 26C
Fig. 26D
Fig. 26E

| | "ka"-column | "sa"-column | "ta"-column | "na"-column | "ha"-column | "ma"-column | "ya"-column | "ra"-column | "wa"-column |
|---|---|---|---|---|---|---|---|---|---|
| "a"-row | a | ka | sa | ta | na | ha | ma | ya | ra | wa | n |
| "i"-row | i | ki | si | ti | ni | hi | mi | | ri | |
| "u"-row | u | ku | su | tu | nu | hu | mu | yu | ru | |
| "e"-row | e | ke | se | te | ne | he | me | | re | |
| "o"-row | o | ko | so | to | no | ho | mo | yo | ro | wo |

Fig. 27

INFORMATION INPUT DEVICE, INFORMATION INPUT METHOD, INFORMATION INPUT CONTROL PROGRAM, AND ELECTRONIC DEVICE

The present application is a continuation application of U.S. patent application Ser. No. 18/480,732, filed on Oct. 4, 2023, which is a continuation application of U.S. patent application Ser. No. 16/900,033, filed on Jun. 12, 2020, which is a continuation application of U.S. patent application Ser. No. 15/144,986, filed on May 3, 2016, which issued as U.S. Pat. No. 10,684,775, which is a continuation application of U.S. patent application Ser. No. 13/764,211, filed on Feb. 11, 2013, which issued as U.S. Pat. No. 9,348,503, which is a continuation application of U.S. patent application Ser. No. 12/738,872, filed on Jun. 22, 2010, which issued as U.S. Pat. No. 9,354,802, which is a National Stage Entry of international application PCT/JP2009/050406, filed on Jan. 7, 2009, which claims priority from Japanese Patent Application No. 2008-003393, filed on Jan. 10, 2008, the disclosure of all of which are incorporated in their entirely by reference herein.

TECHNICAL FIELD

The present invention relates to an information input device, an information input method, an information input control program, and electronic device, and particularly, to an information input device, an information input method, an information input control program, and electronic device, in which information is inputted through a contact or the like with a given detecting unit.

BACKGROUND ART

All characters are generally displayed on the same touch panel, in electric device having a character input function using a touch panel. For example, in an alphabet, all twenty-six characters thereof are displayed on the same touch panel, and in "kana characters (hiragana)" which are Japanese characters, all forty-six characters thereof are displayed on the same touch panel. The touch panel has both a function as a display displaying characters and a function as a touch sensor detecting contact.

In mobile electronic device, like a mobile phone and a PDA (Personal Data Assistance), a character display unit and a character input unit are limited in size, due to the nature of the mobile electronic device. It is, therefore, difficult to secure an area on which many characters are displayed and on which a character to be inputted can be selected in the characters. For example, if the display and the touch panel for character input are arranged together, both of the display and the touch panel are limited in size. Therefore, it is difficult to secure the area on which many characters to be inputted are displayed.

Before an input technology of Japanese kana characters is described, a typical example of a method for dividing all the forty-six kana characters into some groups is described. FIG. 27 illustrates a "kana syllabary" in which Japanese kana characters are arranged in a table format. In the kana syllabary shown in FIG. 27, all the kana characters are described using a combination of alphabetical characters, that is, "the Roman alphabet," so that an arrangement thereof are easily recognized. "Columns" of "あ (hereinafter referred to as "a")-column" to "わ (hereinafter referred to as "wa")-column" mean groups in which forty-six kana characters are grouped according to presence or absence of a consonant and characters having a common consonant. In the kana syllabary shown in FIG. 27, the "column" is illustrated as longitudinally aligned characters. A total of ten "columns" exist, and each of the ten "columns" has a specific name, that is, "a (あ)-column," "か (hereinafter referred to as "ka")-column," . . . "wa (わ)-column" and the like. Characters belonging to the "a (あ)-column" include no consonant, but only a vowel. Characters belonging to "ka (か)-column," "さ (hereinafter referred to as "sa")-column," "た (hereinafter referred to as "ta")-column," "な (hereinafter referred to as "na")-column," "は (hereinafter referred to as "ha")-column," "ま (hereinafter referred to as "ma")-column," "や (hereinafter referred to as "ya")-column," and "ら (hereinafter referred to as "ra")-column" include consonants, "k," "s," "t," "n," "h," "m," "y," and "r," respectively, but the "wa (わ)-column" includes three characters "wa (わ)," "を (hereinafter referred to as "wo")," and "ん (hereinafter referred to as "n")" other than characters belonging to the nine "columns" above described. Neither "wo (を)" nor "n (ん)" include a consonant, but the "wa (わ)" and "n (ん)," however, are included in the "wa (わ)"-column for convenience. "Rows" in "a (あ)-row," "い (hereinafter referred to as "i")-row," "う (hereinafter referred to as "u")-row," "え (hereinafter referred to as "e")-row," and "お (hereinafter referred to as "o")-row" mean groups in which forty-six kana characters are grouped according to characters having a common vowel. In the kana syllabary shown in FIG. 27, each of the "rows" is illustrated as transversely aligned characters. Vowels which the "a (あ)-row," the "i (い)-row," the "u (う) row," the "e (え)-row," and the "o (お)-row" include, are "a (あ)," "i (い)," "u (う)," "e (え)" and "o (お)," respectively. In the "wa (わ)-column," "wa (わ)" is assigned to a character of the "a (あ)-row," "wo (を)" is assigned to a character of the "o (お)-row," and "n (ん)" is regarded as an exception. As mentioned above, a part of a method for dividing into the "column" and "row" includes an exception. However, since the method for dividing into the "column" and "row" is not essential for the essence of the present invention, the exception can be neglected. Additionally, the method for dividing into the "column" and "row" described above is one of examples thereof.

As a way of coping with a problem of displaying many characters for selection, above-mentioned, a method is known, in which many characters are classified into a plurality of groups, and only character typifying each of the groups is displayed on the display. For example, with regard to a method for classifying Japanese kana characters, a method for classifying them into ten "columns" is commonly practiced. A character of "a (あ)-row" which is a character typifying the "column," is displayed on the display. For example, "a (あ)" is displayed on an input unit for inputting "a (あ)-column." Characters to be inputted change, like "a (あ)"→"i(い)"→"uo(う)"→"e(え)"→"o (あ)," when the input unit on which "a (あ)" is displayed is repeatedly pushed down. The method above mentioned is used when a common keyboard besides the touch panel is used.

A method for inputting a character selected from many characters includes a method other than a method for changing, in order, a character to be inputted as above described. That is when a key of "a (あ)" is pushed down once, "a (あ)," "i (い)," "u (う)," "e (え)" and "o (お)," which are other characters in the "a (あ)-row," are displayed on a display unit as candidates to be selected. A character to be inputted is determined in the nominated characters for selection by a second selecting operation.

In a technology related to the information input device above-described, a kana character input device is known, which is described in Japanese Patent Application Laid-open No. 2000-112636 (hereinafter, referred to as "Patent document 1"). In the kana character input device, a plurality of characters are allocated to each of a plurality of keys of a touch panel or a keyboard. According to a selecting operation using the keys, and longitudinal and transverse moving directions of an operation point or an operation force after selection, one kana character is selected. Concretely, five kana characters are ordered and corresponded to each of the keys, and one kana character is selected among the five kana characters according to operated or pushed key and the direction of the operation or pushing down. In the kana character input device of Patent document 1, since five characters are allocated to one key, the number of keys for inputting characters is decreased significantly. Therefore, an area of the touch panel or the keyboard can be reduced, without reducing the size of the key. It is easy for a user to acquire a method for inputting characters, since the user can acquire an input operation by associating forty-six kana characters with groups to which five characters thereof are distributed.

A character input device described in Japanese Patent Application Laid-open No. 2006-178755 (Patent document 2) uses a method similar to the method for inputting kana characters of Patent document 1. In the character input device of Patent document 2, a kana character and a symbol are inputted by using keys for character input to which characters from "a ( あ )-column" to "wa ( わ )-column" are allocated and keys for symbol input. A contact detecting a push from a front face and contacts detecting a push from an upper side, a lower side, a left side and a right side are included in each key. Signals which correspond to five characters, that is, a character of "a ( あ )-row" inputted from the front face and characters of "i ( い )-row," "u ( う )-row," "e ( え )-row," and "o ( お )-row" which are inputted from four directions, that is, from the upper side, the lower side, the left side, and the right side, are outputted from each of the keys.

In a character input device described in Japanese Patent Application Laid-open No. 2003-157144 (Patent document 3), a hiragana input screen is displayed on a display unit. A CPU (Central Processing Unit) detects a contact state of a stylus pen on a display face of the display unit through a touch panel and a touch panel driver, and inputs a character based on the detection result. When the stylus pen makes contact, at a point, with a predetermined area on the touch panel facing a hiragana input key of the hiragana input screen, the CPU inputs a character which is allocated to the hiragana input key. When the stylus pen moves while making contact with the predetermined area on the touch panel facing the hiragana input key, the CPU inputs a different character according to a moving direction. Since a quite easy selection operation of the hiragana input key is carried out by the method mentioned above, many characters can be easily inputted.

In a kana input method using a liquid crystal touch panel described in Japanese Patent Application Laid-open No. 2002-222053 (Patent document 4), a group of characters for selection of characters to be inputted is superimposed on a screen of the liquid crystal touch panel. Initially, a character string, "a ( あ )," "ka ( か )," "sa ( さ )," "ta ( た )," "na ( な )," "ha ( は )," "ma ( ま )," "ya ( や )," "ra ( ら )," and "wa ( わ )," consisting of characters in "a ( あ )-row" of each "column" are transversely displayed in line. When a touch input on one character in the character string occurs, a character string,

4 other than the "a ( あ )-row," of the "column" including the character at which the touch input occur, are longitudinally superimposed in line under the key on which the touch input is occurred. In this state, when a touch input on one character in the "column" longitudinally arranged in line occurs, the character is inputted.

In a character input method described in Japanese Patent Application Laid-open No. 2005-92441 (Patent document 5), ten characters in "a ( あ )-row" of each column are displayed on a screen which is lotted on a touch panel. When a character is touched, characters in the "column" including the touched character are superimposed in line transversely or longitudinally. When a character to be inputted in the characters displayed in line is touched, the touched character is inputted.

DISCLOSURE OF THE INVENTION

However, above described arts have the following problems. The method, in which an inputted character is switched by pushing a touch panel, has a problem that a key has to be pushed down many times when a character which a user intends to input is displayed. Even if all kana characters are displayed, it is difficult to quickly search a character which a user wants to input, since the number of the characters is large. In a character input using the key, when a character which a user intends to input is displayed, the key needs to be pushed down many times.

In the kana character input device described in Patent document 1, one character is selected according to the moving directions of a key operation force from front to back and from side to side. Therefore, each key needs a structure for detecting the moving directions, and a structure of the key become complicated. The kana character input device described in Patent document 1 has problems such as increase of key weight, increase of key thickness, increase of manufacturing cost and the like.

In the character input device described in Patent document 2, since it is necessary that directions in which each key is pushed down are detected, a structure of the key becomes complicated. Therefore, the character input device described in Patent document 2 has the same problems as Patent document 1.

In the character input device described in Patent document 3, a character to be inputted are selected according to a moving direction of a touched part on the touch panel. A user, therefore, has to memorize the correspondence relation between the moving direction and a character to be inputted. A character to be selected according to the moving direction may be displayed on the touch panel. For this purpose, there is a method for extending an area of the touch panel, for example. In this case, however, there are problems such as increase of a size of the touch panel and increase of manufacturing cost. Meanwhile, there is a method for reducing a size of a character to be displayed on the touch panel. In this case, a problem occurs, in which visibility gets worse.

In a kana input method described in Patent document 4, initially, a group of characters to be selected for input is transversely displayed in line, and, next, it is longitudinally displayed in line. A user has to move a contact spot on the touch panel in two stages, that is, in a transverse direction and in a longitudinal direction, until one character is selected finally. Therefore, there is a problem that a user's operation is troublesome. Further, there is another problem that when a user selects a character displayed at the end part of the line, a distance over which the user moves the contact spot becomes long.

In a character input method Patent document 5, when a character typifying a "column" is initially selected, next, all characters of the "column" are, in line, displayed transversely or longitudinally. Therefore, when a character displayed at the end part of the line is selected, a problem occurs, in which a distance over which a user moves the contact spot becomes long. Further, selecting a character in characters displayed in line, a user can obliquely move the contact spot by mistake. In this case, it is determined that contact with the touch panel disappears during movement of the contact spot, and a character other than a character a user intends to input may be inputted.

The invention is achieved in consideration of the problems of the related art mentioned above, and the purpose of the invention is to provide an information input device, an information input method, an information input control program, and electronic device, in which information is inputted by easy operations, even if a display unit size is limited, like a mobile device, such as a mobile phone and the like.

An information input device of the present invention has: a display unit displaying a plurality of figures; a detecting unit arranged in front of the display unit or behind the display unit, and detecting whether a physical contact from an outside exists or not and a contacted position at which the physical contact exists; and a control unit deciding a figure displayed on the display unit and a position at which the figure is displayed, and inputting information based on a signal from the detecting unit, and when the detecting unit detects the physical contact exists, the control unit determines a first figure displayed at a nearest position to the contacted position in the plurality of figures based on the contacted position and decides a second figure displayed at a position surrounding the contacted position based on a kind of the first figure.

An information input method of the present invention has: deciding a figure to be displayed and a position at which the figure is displayed; displaying a plurality of the figures; detecting whether a physical contact from an outside exists or not and a contacted position at which the physical contact exists; determining a first figure displayed at a position nearest to the contacted position in the plurality of figures based on the contacted position, when existence of the physical contact is detected; deciding a second figure displayed at a position surrounding the contacted position based on a kind of the first figure; and inputting information based on the contacted position.

The information input device and the information input method of the invention have an advantage that information is readily inputted by selecting a desired figure in a plurality of figures using an easy operation.

BRIEF DESCRIPTION OF DRAWING

FIGS. 7A, 7B and 7C are plain views illustrating examples of modifications of configurations of character input boxes.

FIGS. 8A, 8B and 8C are plain views illustrating examples of modifications of configurations of the character input boxes.

FIGS. 13A, 13B, 13C, 13D, and 13E are plain views illustrating examples of displays in which a kana character, a symbol, and a character string are displayed on a display area of the second embodiment of the invention.

FIGS. 15A, 15B, 15C, 15D, and 15E are plain views illustrating examples of displays of nominated character displaying block of the second embodiment of the invention.

FIG. 24 is a plain view illustrating another example of displayed contents of the fourth embodiment of the invention.

FIGS. 26A, 26B, 26C, 26D, and 26E are plain views illustrating other examples of displayed contents of the fifth embodiment of the invention.

FIG. 27 is "kana syllabary" in which Japanese kana characters are arranged in a tabular form.

BEST MODE FOR CARRYING OUT THE INVENTION

First Embodiment

Figure 1:
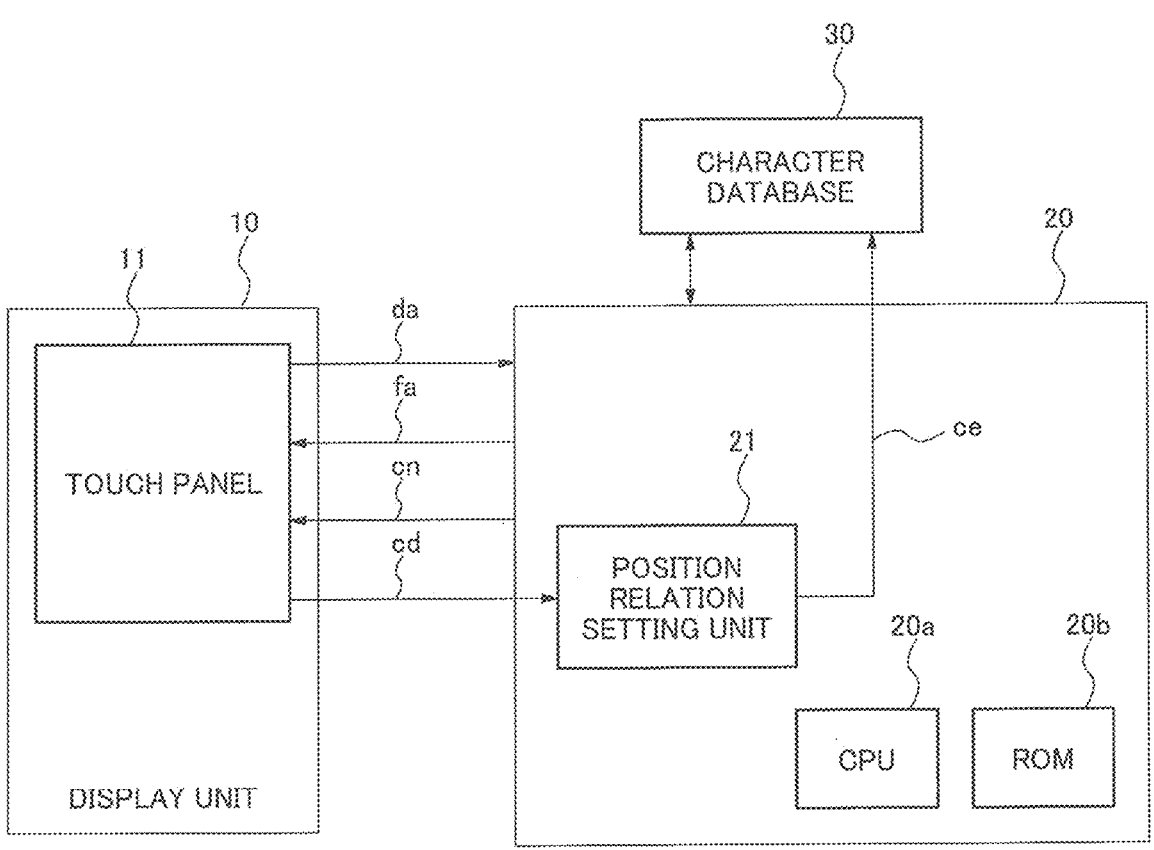
FIG. 1 is a block diagram illustrating a configuration of electronic device of a first embodiment of the invention.

FIG. 1 is a block diagram illustrating a configuration of electronic device of a first embodiment of the invention. The electronic device includes a mobile phone device, for example. The electronic device includes a display unit 10, a processing device 20, and a character database 30, as shown in FIG. 1. The display unit 10 is composed of a liquid crystal display or the like, for example, and includes a function as a touch panel 11 for character input. The touch panel 11 is separated into a predetermined number of character input boxes according to an input box setting signal fa of the processing device 20. The display unit 10 allocates each character of "a ( あ )-row" in kana characters ("a ( あ )," "ka ( か )," "sa ( さ )," "ta ( た )," "na ( な )," "ha ( は )," "ma ( ま )," "ya ( や )," "ra ( ら )," "wa ( わ )") into each of the character input boxes described above, and displays them. When any one of the character input boxes described above is pushed, the touch panel 11 outputs position information da corresponding to a position of the character input box which is pushed. Further, when an operation for updating the character database 30 is performed, the touch panel 11 outputs a database updating signal cd.

The processing device 20 includes a CPU 20*a* as a computer controlling a whole of the electronic device, and a ROM (Read Only Memory) 20*b* in which an information input control program causing the CPU 20*a* to operate is stored. In the embodiment, the processing device 20 allocates each character of "a ( あ )-row" in forty-six kana characters into each character input box and displays them, by outputting the input box setting signal fa to the touch panel 11. When any one of the character input boxes on which each of the characters in "a ( あ )-row" is displayed is pushed down, the processing device 20 displays other characters in the "column" in which a character displayed in the pushed character input box is included, in character input boxes adjacent to the pushed character input box, based on the position information da outputted from the touch panel 11. Display of the characters in the adjacent character input boxes is carried out, despite whether or not characters are already displayed in the character input boxes. When a character input box is pushed down and then the push is released, the processing device 20 decides, as an inputted character, a character displayed in the character input box which is pushed down just before the release.

The processing device 20 displays a predetermined character in the character input box adjacent to the pushed character input box. A relative position relation between the character displayed in the pushed character input box and the character displayed in the character input box adjacent thereto (hereinafter, referred to as "relative display position") is fixed according to a kind of the vowel which each character includes. For example, a character in "i ( い )-row" having a vowel "i" is fixed on the lower side of the pushed character input box, a character in "u ( う )-row" having a vowel "u" is fixed on the left side thereof, a character in "e ( え )-row" having a vowel "e" is fixed on the upper side thereof, and a character in "o ( お )"-row having a vowel "o"

is fixed on the right side thereof. The relative display position is set in advance, and is stored in the character database 30.

The character input boxes adjacent to the pushed character input box may be located not only adjacent to the upper side, the lower side, the left side, and the right side of the pushed character input box as described above, but also adjacent to the upper left side, the lower left side, the upper right side, and the lower right side thereof. The processing device 20 includes a position relation setting unit 21. The position relation setting unit 21 transmits a position relation setting signal ce to the character database 30 and optionally sets the relative display position, based on the database updating signal cd outputted from the touch panel 11.

Figure 2:
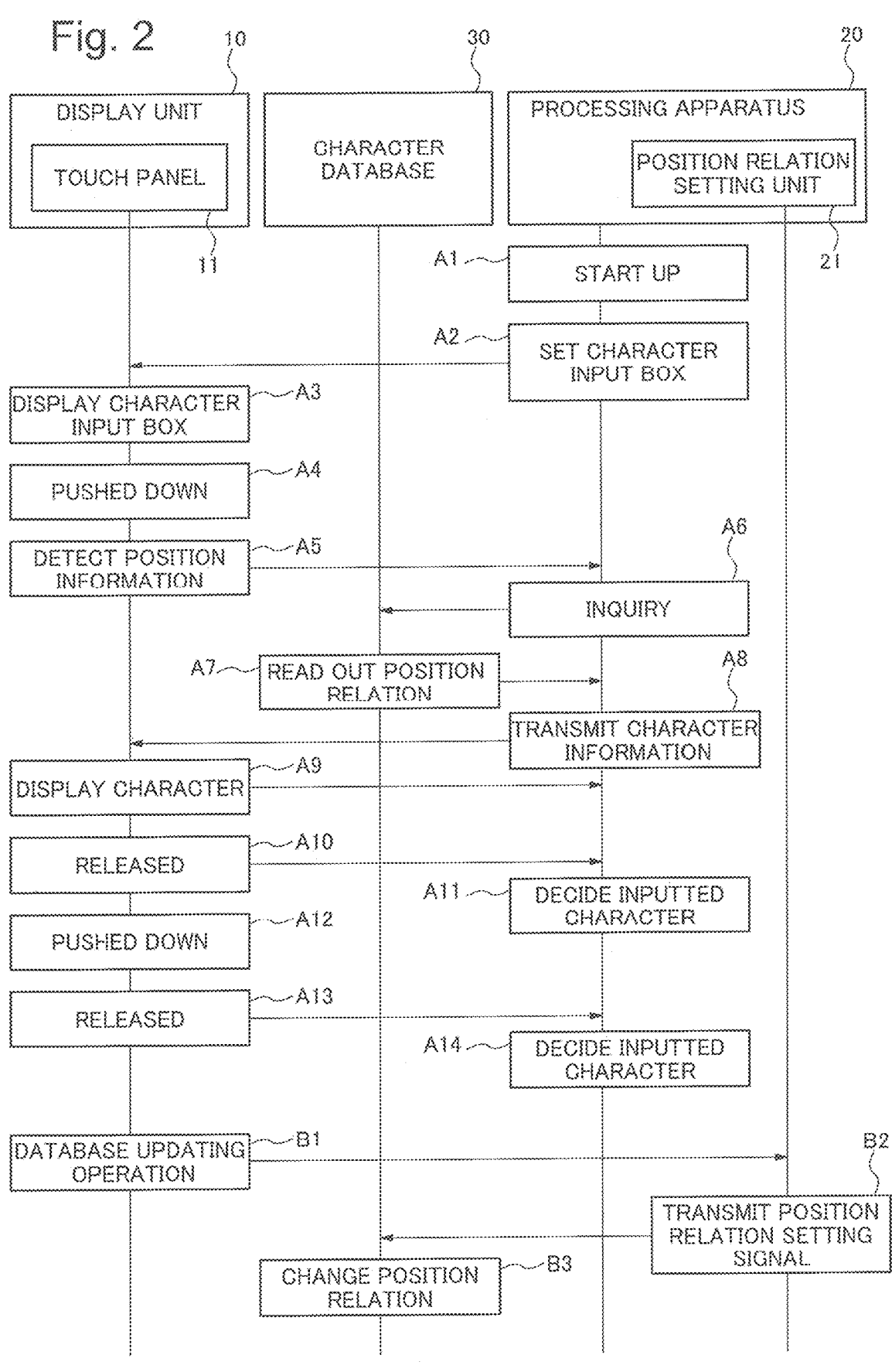
FIG. 2 is a sequence chart illustrating operations of the electronic device of the first embodiment of the invention.

FIG. 2 is a sequence chart illustrating operations of the electronic device shown in FIG. 1. FIGS. 3A, 3B, and 3C, FIGS. 4A, 4B, and 4C, FIGS. 5A, 5B, and 5C, and FIGS. 6A, 6B, and 6C are plain views illustrating change of displayed contents on the display unit which occurs when the touch panel 11 shown in FIG. 1 is pushed down. Referring to the drawings, contents of processing of the information input method used in the electronic device of the first embodiment are described.

Figure 3A:
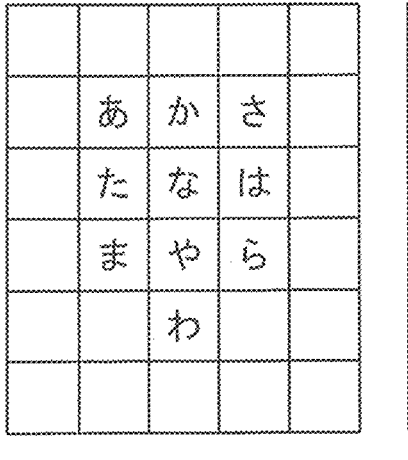
FIGS. 3A, 3B and 3C are plain views illustrating change of displayed contents which occurs when a touch panel of the electronic device of the first embodiment of the invention is pushed down.
Figure 3B:
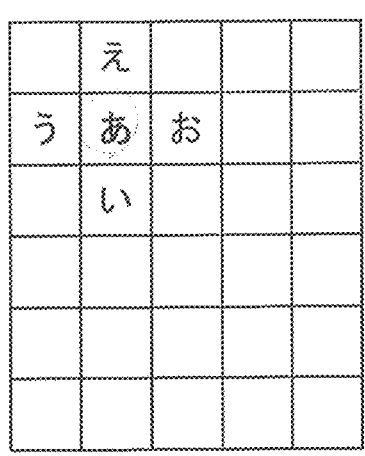

In the electronic device of the embodiment, each character in "a ( あ )-row" of kana characters is allocated into each character input box which is set in advance, and is displayed. When any one of the character input boxes in which each character in the "a ( あ )-row" is displayed is pushed down, other characters in the "column" to which the character displayed in the pushed character input box belongs are displayed in the character input boxes adjacent to the pushed character input box. Displaying characters in the adjacent character input boxes is not influenced by whether or not characters are already displayed in the adjacent character input boxes. As shown in FIG. 3B, for example, no character has been displayed in the character input box in which "u ( う )" is displayed when the character input box of "a ( あ )" is pushed down, before "u ( う )" is displayed. In the character input boxes in which "i ( い )" and "o ( お )" are displayed, "ta ( た )" and "ka ( か )" are already displayed before then, respectively. When a character input box is pushed down and then released, the character displayed in the character input box, which is pushed down just before the release, is determined as an inputted character.

Next, referring to FIG. 2, operations of the electronic device of the embodiment are described. When a user performs an operation using a function, e.g. mail creation, which requires character input, the processing device is started up (step A1). The processing device 20 outputs the input box setting signal fa to the touch panel 11 and sets the character input box (step A2). In the touch panel 11, as shown in FIG. 3A, the character input box is displayed. In each character input box which is set in advance, each character in "a ( あ )-row" is allocated and displayed (step A3). In this condition, when a character input box, in which "a ( あ )" is displayed, is pushed down, for example (step A4), a position of the pushed character input box is detected, and the position information da is transmitted to the processing device 20 (step A5).

The processing device 20 inquires of the character database 30 based on the position information da (step A6) and reads out a relative display position of a character (step A7). The processing device 20 transmits the character information cn corresponding to the relative display position to the touch panel 1 (step A8). A character corresponding to the character information cn is displayed in the touch panel 1 (step A9). In this case, as shown in FIG. 3B, regarding the character ("a ( あ )") displayed in the character input box which is pushed down, for example, in each of character input boxes adjacent to the lower side, the left side, the upper side, and the right side of the character input box of "a ( あ )," characters of "a ( あ )-column" other than "a ( あ )" ("i ( い )," "u ( う )," "e ( え )" and "o ( お )") are displayed, respectively. As mentioned above, the relative display position of each character is set in advance according to a kind of the vowel which each character includes, and is stored in the character database 30.

Figure 3C:
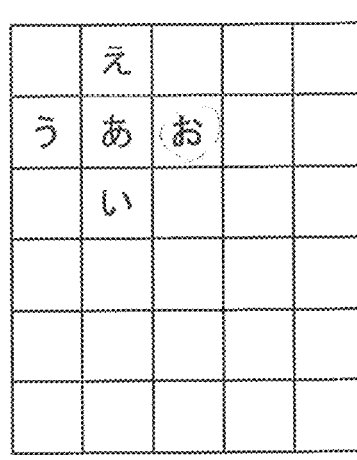

Next, when a user releases pushing the character input box in the display state (step A10), "( あ )" is decided as an inputted character (step A11). When a user shifts the character input box, which is currently pushed, to another character input box, without releasing a push of the character input box (when the step A10 is not carried out), the processing device 20 operates as mentioned below. For example, a user pushes down the character input box in which "o ( お )" is displayed without releasing the character input box in which "( あ )" is displayed (step A12). When a user shifts the character input box to be pushed down to the character input box of the character "o ( お )," initially a push of the character input box of "a ( あ )" is released, and secondly a push of the character input box of "o ( お )" is released (step A13). Then, as shown in FIG. 3C, "o ( お )" is decided as an inputted character (step A14). As described above, a character displayed in a character input box which is finally pushed down is decided as an inputted character.

Figure 4A:
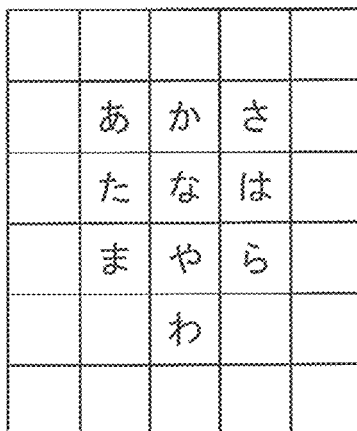
FIGS. 4A, 4B and 4C are plain views illustrating change of displayed contents which occurs when the touch panel of the electronic device of the first embodiment of the invention is pushed down.
Figure 4B:
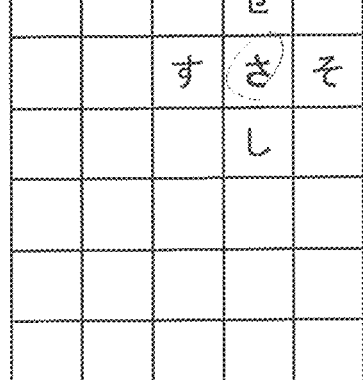
Figure 4C:
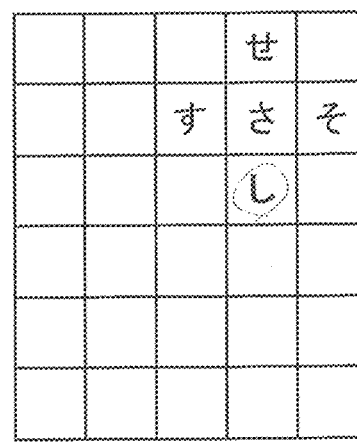

Next, a method for deciding an inputted character, which is carried out when a character input box in which "sa ( さ )" is displayed is pushed down, is described. When the character input box in which "sa ( さ )" is displayed is pushed down, as shown in FIG. 4B, in each of character input boxes adjacent to the lower side, the left side, the upper side, and the right side of the character input box of "sa ( さ )," characters of "sa ( さ )-column" other than "sa ( さ )" ("し (hereinafter referred to as "si")," "す (hereinafter referred to as "su")," "せ (hereinafter referred to as "se")" and "そ (hereinafter referred to as "so")") are displayed, respectively. The relative display position of each character is set in advance according to a kind of the vowel which each character includes. The relative display position in FIG. 4B is in a condition similar to FIG. 3B. In this condition, when a user releases pushing the character input box, "sa ( さ )" is decided as an inputted character. When a user pushes down the character input box in which, for example, "si ( し )" is displayed without releasing a push, and releases pushing the character input box of "si ( し )" after releasing pushing the character input box of "sa ( さ )," "si ( し )" is decided as an inputted character, as shown in FIG. 4C.

Figures 5A, 5B, 5C:
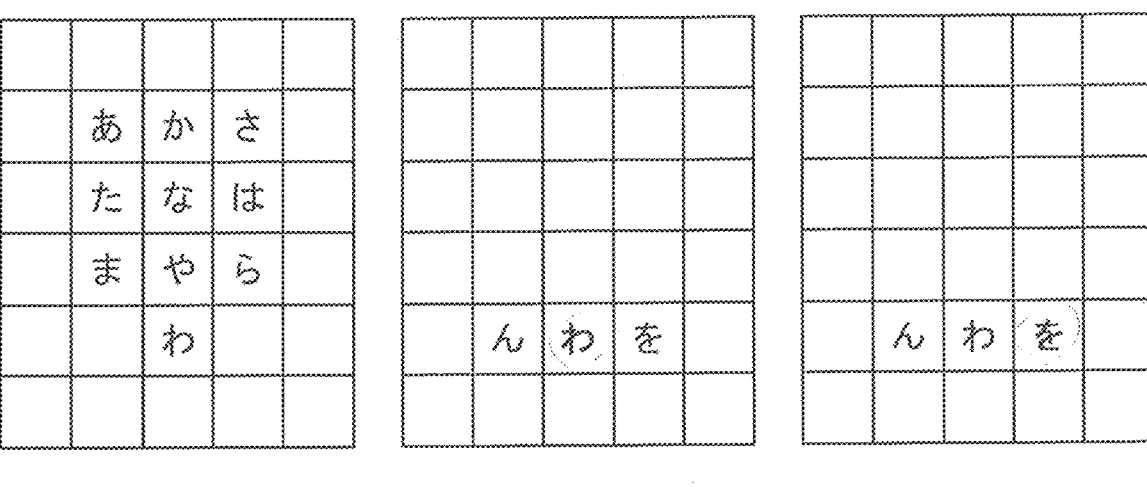
FIGS. 5A, 5B and 5C are plain views illustrating change of displayed contents which occurs when the touch panel of the electronic device of the first embodiment of the invention is pushed down.

A method for deciding an inputted character which is carried out when the character input box in which "wa ( わ )" is displayed is pushed down is the same as the above mentioned. That is, as shown in FIG. 5B, when the character input box in which "wa ( わ )" is displayed is pushed down, in each of character input boxes adjacent to the right side and the left side of the character input box of "wa ( わ )," characters belonging to "wa ( わ )-column" ("wo ( を )" and "n ( ん )") are displayed. The relative display position is set in advance, and stored in the character database 30. When pushing the character input box of "wa ( わ )" is released in this condition, "wa ( わ )" is decided as an inputted character. When the character input box in which "wo ( を )" is displayed is pushed down without releasing pushing the character input box of "wa ( わ )," and pushing the character input box of "wo ( を )" is released after releasing pushing the character input box of "wa ( わ )," "wo ( を )" is decided as an inputted character, as shown in FIG. 5C.

Figures 6A, 6B, 6C:
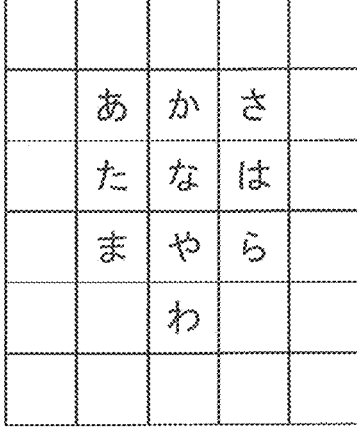
FIGS. 6A, 6B and 6C are plain views illustrating change of displayed contents which occurs when the touch panel of the electronic device of the first embodiment of the invention is pushed down.

Next, updating the character database 30 is described. When an operation on the touch panel 11 updating the character database 30 is performed (step B1), the database updating signal cd is outputted from the touch panel 11 to the position relation setting unit 21. By the position relation setting unit 21, the position relation setting signal ce is outputted to the character database 30, and relative display positions for each character stored are set. The set contents can be decided optionally by a user. For example, the relative display positions may be set as shown in FIG. 6B. In this case, regarding the character "a ( あ )" which is displayed in the character input box pushed down, "i ( い )," "u ( う )," "e ( え )" and "o ( お )" are displayed in each of character input boxes adjacent to the left side, the lower left side, lower side, and lower right side of the character input box of "a ( あ )," respectively. In this condition, when a user releases pushing the character input box of "a ( あ )," "a ( あ )" is decided as an inputted character. When a user pushes down the character input box in which for example, "o ( お )" is displayed without releasing pushing the character input box of "a( あ )," and releases pushing the character input box of "o ( お )" after releasing pushing the character input box of "a ( あ )," "o ( お )" is decided as an inputted character, as shown in FIG. 6C. As mentioned above, the method for deciding an inputted character does not depend on the relative display position.

In FIGS. 3B and 3C, FIGS. 4B and 4C, FIGS. 5B and 5C, and FIGS. 6B and 6C, when a character is displayed in a character input box adjacent to a pushed character input box, no display other than that of the character in the character input box adjacent thereto is performed. However, the display other than that of the character in the character input box adjacent thereto may maintain contents which are displayed before the input box is pushed down.

As mentioned above, in the first embodiment, each of characters in "a ( あ )-row" is allocated in each character input box which is set in advance, and is displayed. When any one of character input boxes, in which the characters in the "a ( あ )-row" are displayed, is pushed down, other characters of the "column" in which a character displayed in the pushed character input box is included are displayed in character input boxes adjacent to the pushed character input box. Then, in spite of whether or not a character is already displayed in character input boxes adjacent to the pushed character input box, a character is displayed in the character input boxes adjacent thereto. Further, when a character input box is pushed down and then the push is released, a character displayed in the character input box, which is pushed down just before the release, is decided as an inputted character. Therefore, input of forty-six kana characters can be correctly and readily performed by using only small area consisting of character input boxes with six rows and five columns. Furthermore, when one character is inputted, it is not necessary that the same character input box is pushed down more than once. Therefore, time for character input is reduced, and an operation mistake in which a different character is inputted due to miscalculation of the number of pushing the input box does not occur.

In the electronic device of the first embodiment, character input boxes can be reduced by using character input boxes with a different configuration. For example, in FIGS. 5A, 5B, and 5C, character input can be performed by using only area consisting of character input box with five rows and five columns without arranging character input boxes in a column under "wa ( わ )." Or, in FIGS. 6A, 6B, and 6C, character input can be performed by using only area consisting of character input boxes with four rows and five columns without arranging character input boxes in a column over "a ( あ )" and in the column under "wa ( わ )."

Figure 9A:
FIGS. 9A, 9B and 9C are plain views illustrating examples of modifications of configurations of the character input boxes.
Figure 9B:
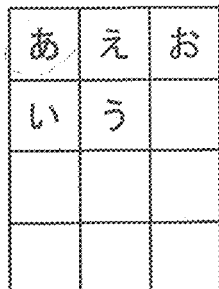
Figure 9C:
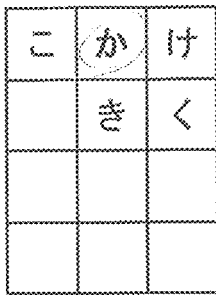

FIGS. 7A, 7B, and 7C illustrate examples of a method of character input using character input boxes with four rows and five columns. FIGS. 8A, 8B, and 8C illustrate examples of a method of character input using character input boxes with six rows and three columns. FIGS. 9A, 9B, and 9C illustrate examples of a method of character input using character input boxes with four rows and three columns. In these figures, FIGS. 7A, 8A, and 9A illustrate display states before character input boxes are pushed. FIGS. 7B, 8B, and 9B illustrate display states in which the character input box of "a ( あ )" is pushed down, and FIGS. 7C, 8C, and 9C illustrate display states in which the character input box of "ka ( か )" is pushed down. Though relative positions of characters depends on a form of character input boxes, a basic method for deciding an inputted character is similar to the above case using the character input boxes with six rows and five columns.

Figure 10A:
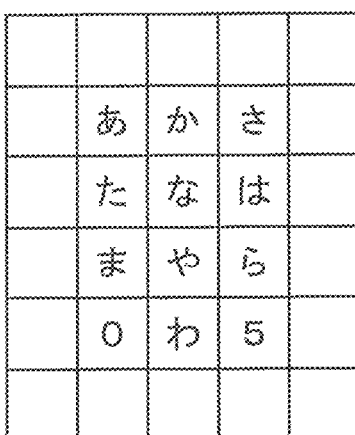
FIGS. 10A and 10B are plain views illustrating examples of displays in which kana characters and numbers are displayed in the character input boxes.
Figure 10B:
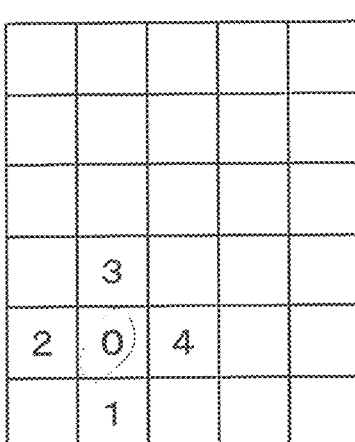
Figure 11A:
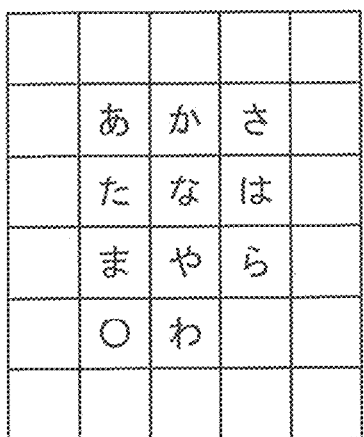
FIGS. 11A and 11B are plain views illustrating examples of displays in which kana characters and numbers are displayed in the character input boxes.
Figure 11B:
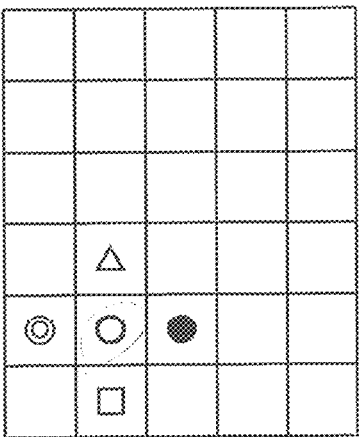

In above descriptions, the examples in which only kana characters are displayed in the character input boxes are disclosed. A character other than the kana characters may be displayed in the character input boxes. Numbers or symbols may be displayed in unused character input boxes arranged on the left side and the right side of "wa ( わ )," for example, and be inputted. FIGS. 10A and 10B illustrate an example of a method of character input in which kana characters in "a ( あ )-row" and numbers "0" and "5" are displayed in character input boxes with six rows and five columns. As shown in FIG. 10B, when the character input box of "0" is selected, for example, "1," "2," "3," and "4" are displayed in adjacent character input boxes. Therefore, input of numbers is very easy. FIGS. 11A and 11B illustrate an example of a method of character input in which kana characters in "a ( あ )-row" and symbols are displayed in character input boxes with six rows and five columns. As shown in FIG. 11B, when the character input box of "O" is selected, for example, symbols, "◎," "□," and the like are displayed in adjacent character input boxes. Therefore, input of symbols is very easy.

As mentioned above, in the first embodiment, characters are displayed, which belong to the same "column" as the column including characters in "a ( あ )-row" displayed in a pushed character input box. Therefore, a user can instantly find a character which the user intends to input. Relative display positions of a character displayed in the pushed character input box and each character displayed in character input boxes adjacent to the pushed character input box are fixed based on a kind of the vowel of each character. Therefore, character input is always performed by one or two standard actions, correctly. The two actions means a two-stage operation including selection of character input box of a character in "a ( あ )-row," and another selection of a character input box adjacent to the selected character input box. As mentioned above, since an operation for inputting a character is intuitive and simple, user's burden which is newly required for learning a method of input is remarkably reduced.

Furthermore, a relative display position of a character can be optionally set by the position relation setting unit 21. Therefore, since a display position is set according to a user's choice, operability is improved.

The first embodiment of the invention is described in detail using drawings as the above. Specific configurations of the invention are not limited to the first embodiment, and an embodiment, in which design change is performed without departing from the substance of the invention, is included in the invention. For example, in the first embodiment, a character is inputted by using the touch panel 11. On the other hand, an information input box can be set instead of the character input box, and information, for example, a menu, may be selected. In this case, plural pieces of information are allocated to each information input box, and displayed. When any one of the information input boxes, in which each information is displayed, is pushed down, sub-information is displayed, which is associated with information displayed in the pushed information input box, in information input boxes adjacent to the pushed information input box. Then, in spite of whether or not information is already displayed in the adjacent information input box, information may be displayed in the adjacent information input box. Incidentally, something other than a character, a number, a symbol is included in "information" above described. An input device of "information" is described below as a second embodiment.

Second Embodiment

Figure 12:
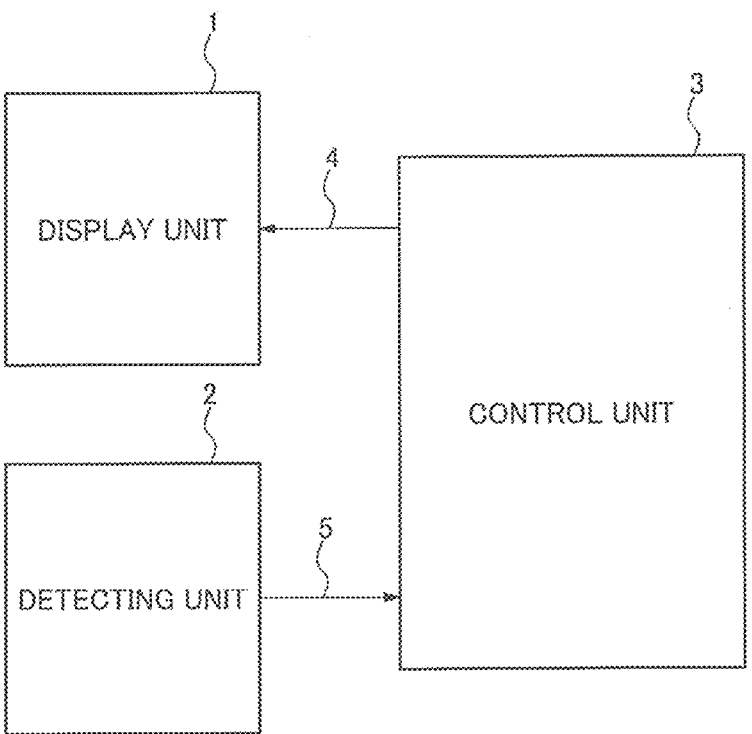
FIG. 12 is a block diagram illustrating a configuration of an information input device of a second embodiment of the invention.
Figure 14A:
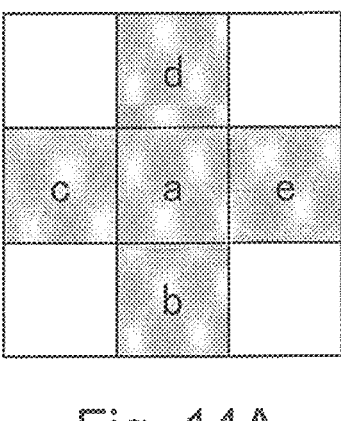
FIGS. 14A, 14B, 14C, and 14D are plain views illustrating modified examples of display states around nominated characters of the second embodiment of the invention.
Figure 14B:
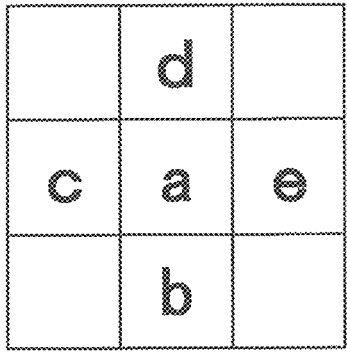
Figure 14C:
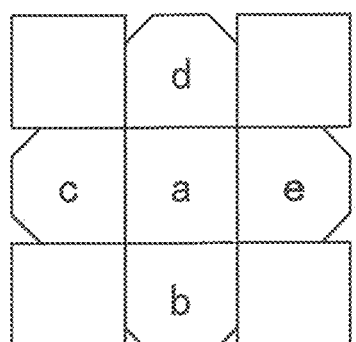
Figure 14D:
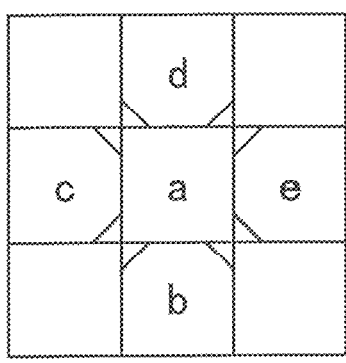

The invention can be applied to input for general information in addition to a kana character, a number, and a symbol. FIG. 12 is a block diagram illustrating a configuration of an information input device of a second embodiment of the invention. The information input device includes a display unit 1, a detecting unit 2, and a control unit 3.

The display unit 1 displays a figure according to a display information signal 4. "Figure" is a predetermined form, for example, a character, a symbol, a character string including a character or a symbol, a pictogram and the like. "Character" is characters of countries used for description of languages, such as, for example, Japanese kana characters described in the first embodiment, the Arabic numerals, alphabet widely used in the whole world, and the Greek alphabet. "Symbol" is a relatively simple figure which is used in order to express predetermined meaning, an idea and the like, for example, ?, !, ○, ◎ and the like. "Pictogram" is what a drawing is simplified, and a more complicated figure than "symbol," and can be used by being mixed in a sentence with characters or symbols. If it is not particularly necessary to treat kinds of "figure" by dividing into "character," "symbol," "character string," "pictogram," and the like, "character," "symbol," and the like are described below as "character and the like."

The detecting unit 2 can detect a two-dimensional position. Specifically, the detecting unit 2 detects presence or absence of physical contact from an outside and a contacted position (hereinafter, referred to as "contacted position"), and outputs, to the control unit 3, a detection signal 5 including two-dimensional information representing the presence or absence of the contact and the contacted position.

A position relation between the display unit 1 and the detecting unit 2 is described. A first position relation is used in a case in which the detecting unit 2 is arranged on an upper face of the display unit 1. In this case, the detecting unit 2 needs to be transparent so that displayed contents of the display unit 1 can be seen. For example, a touch panel arranged on a liquid crystal panel corresponds to the first position relation. The liquid crystal panel corresponds to the display unit 1, and the touch panel corresponds to the detecting unit 2. A second position relation is used in a case in which the display unit 1 is arranged on an upper face of the detecting unit 2. For example, the liquid crystal panel arranged on the touch panel or a key board corresponds to the second position relation. Also in this case, the display unit 1 is the liquid crystal panel, and the detecting unit 2 is the touch panel or the key board. The position relation between the display unit 1 and the detecting unit 2 may be applied to both cases mentioned above, and a given correspondence relation has only to be needed, which is built between a position at which a character or the like is displayed in a display face of the display unit 1 (hereinafter, referred to as "displayed position") and the contacted position detected by the detecting unit 2. If the correspondence relation is built, by the detection signal 5 from the detecting unit 2, the displayed position of a character which is displayed at a position on the display unit 1 corresponding to the contacted position can be detected. As described below, detection of the displayed position is performed by the control unit 3.

The control unit 3 outputs, to the display unit 1, the display information signal 4 to specify a character and the like displayed on the display unit 1 and the displayed position of the characters and the like. The display information signal 4 includes information determining a figure displayed on the display unit 1. Therefore, the display information signal 4 may include image information, such as bitmap information, which directly expresses displayed figures, or identification information, such as a character code, for designating figures. The display unit 1 displays characters or the like based on the image information or the identification information. The display information signal 4 includes information designating the displayed position. A coordinate at which the characters or the like are displayed may be included in the display information signal 4. If the display unit 1 performs dynamic display by scanning pixels, the displayed position may be designated according to timing of output of information designating the characters or the like in the display information signal 4.

The control unit 3 receives the detection signal 5 to recognize whether or not contact with the detecting unit 2 from an outside occurs and the contacted position. When the contact with the detecting unit 2 occurs, the control unit 3 determines the character or the like displayed in the contacted position based on the display information signal 4. As mentioned above, since information designating the displayed position is included in the display information signal 4, the characters or the like displayed in the displayed position corresponding to a detected position can be specified with the display information signal 4 and the detection signal 5. Displayed contents in an area around the contacted position (hereinafter, referred to as "surrounding area of the contacted position") is changed based on kinds of the characters and the like displayed in the contacted position. Specifically, the control unit 3 changes the display information signal 5 and changes characters or the like displayed in an area of the display face of the display unit 1 corresponding to the surrounding area of the contacted position. Examples of specific changed contents of the characters or the like displayed in the display area corresponding to the surrounding area of the contacted position are described below.

FIGS. 13A and 13B are plain views illustrating an example of display states of the display unit 1. The display face of the display unit 1 is divided into twenty-five display blocks. In the second embodiment, displayed characters or the like are classified into nine groups. Twenty-six alphabetical characters are grouped by five characters from "a" in order, and divided into six groups as a whole. Symbols and character strings are classified into three groups. In an initial state, all nine kinds of characters and the like are displayed, which include six characters, "a," "f," "k," and the like, in the twenty-five alphabetical characters, symbols, "?" and "@" and a character string, "http://." Since these characters and the like typify characters, symbols, and character strings which belong to a certain group, these characters and the like are described below as "typifying character." The display blocks need not to be orderly arranged in a grid-like form, as shown in FIG. 13A, but has only to be divided so that any one of characters or the like is selected and contact therewith is determined.

When a user brings a finger, or a pen for contact, like a stylus pen, and the like into contact with the display block of "a" in FIG. 13A, four characters, "b," "c," "d," and "e" are displayed in four display blocks which are located on the lower side, the left side, the upper side and the right side of "a," respectively, as shown in FIG. 13B. Similarly when the display block of "?" is touched, four symbols, "(", ")", "." and "," are displayed in four display blocks which are located on the left side, the right side, the upper side and the lower side of "?" respectively, as shown in FIG. 13C. When the display block of "@" is touched, symbols, "_", ":" and character strings ".com", ".co" are displayed in four display blocks which are located on the left side, the upper side, the right side and the lower side of "@" respectively, as shown in FIG. 13D. When the display block of "http://" is touched, four character strings, "www.", ".jp/", ".co" and ".com/" are displayed in four display blocks which are located on the lower side, the left side, the upper side and the right side of "http://" respectively, as shown in FIG. 13E. Kinds of the characters and arrangements thereof and the like in FIGS. 13A, 13B, 13C, 13D and 13E are examples thereof.

Thus, when a user makes contacts with a display block of a typifying character, characters belonging to the same group are displayed as a candidate for selection in display blocks surrounding the display block of a typifying character. Characters displayed around the typifying character are described as "nominated character." Alphabet, a number, a symbol, a character string, a pictogram or the like may be mixed in the typifying character and the nominated character.

A user moves a contacted position, which is a position which the user brings a finger or the like into contact with, to a display block of a nominated character which the user selects, while bringing the finger or the like into contact with the detecting unit 2, and separates the finger or the like from the detecting unit 2. Then, a character displayed in a display block, which the finger or the like comes in contact with just before the user separates the finger or the like, is adopted as an inputted character. When the user separates the finger without moving the finger while bringing the finger or the like into contact with the display block of a typifying character, the typifying character is adopted as an inputted character.

It is desirable that a display block of a nominated character is definitely discriminated from other display blocks. Therefore, display state of the nominated character or the adjacent to the nominated character may be changed. In FIGS. 13B, 13C, 13D and 13E, boxes of the display blocks of selected typifying characters and nominated characters which are selected are displayed relatively thick. In FIGS. 14A, 14B, 14C and 14D, other examples in which a display state around a nominated character is changed are illustrated. Change of a displayed color or color density of the selected typifying character and the nominated characters (FIG. 14A), change of sizes of the selected typifying character and the nominated characters (FIG. 14B), or change of a shape of the display blocks of the nominated characters (FIGS.

14C and 14D) may be performed. Or, like the first embodiment, only the selected typifying character and the nominated characters may be displayed.

Instead of using available display blocks as shown in FIG. 13B, or FIGS. 14A, 14B, 14C and 14D, there is a method of display in which new display blocks for display of selected characters, that is, "nominated character displaying block" are displayed on a display of a typifying character in an overlapped manner. The selected typifying character and the nominated characters are displayed in the nominated character displaying blocks. The nominated character displaying blocks is displayed on a display of the original typifying character in an overlapped manner. FIG. 15A illustrates a display example in which seven characters of typifying characters of alphabet, a symbol and a character string are arranged in a display block with three rows and three columns. FIGS. 15B, 15C, 15D and 15E illustrate display examples of the nominated character displaying blocks in which "a" or "f" is selected. That is, the nominated character displaying blocks in a cross shape or a round shape are displayed on the typifying character in an overlapped manner.

Figure 16:
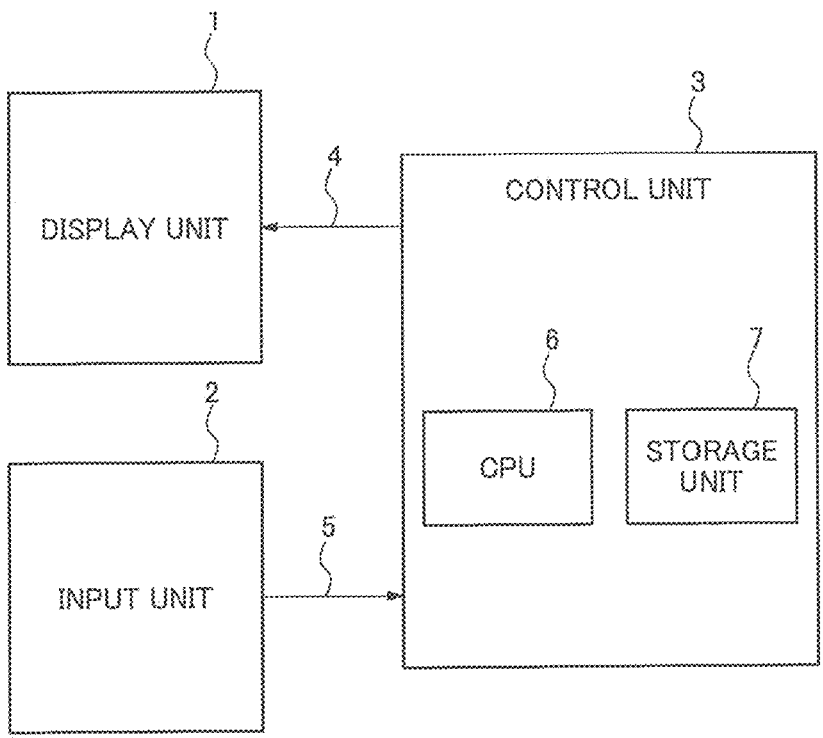
FIG. 16 is a block diagram illustrating a configuration of an information input device with a CPU of the second embodiment of the invention.

The control unit 3 of the second embodiment may control an operation by program processing. In this case, as shown in FIG. 16, the control unit 3 includes a CPU 6 and a storage unit 7. The CPU 6 controls an operation of the control unit 3 according to a program stored in the storage unit 7.

Figure 17:
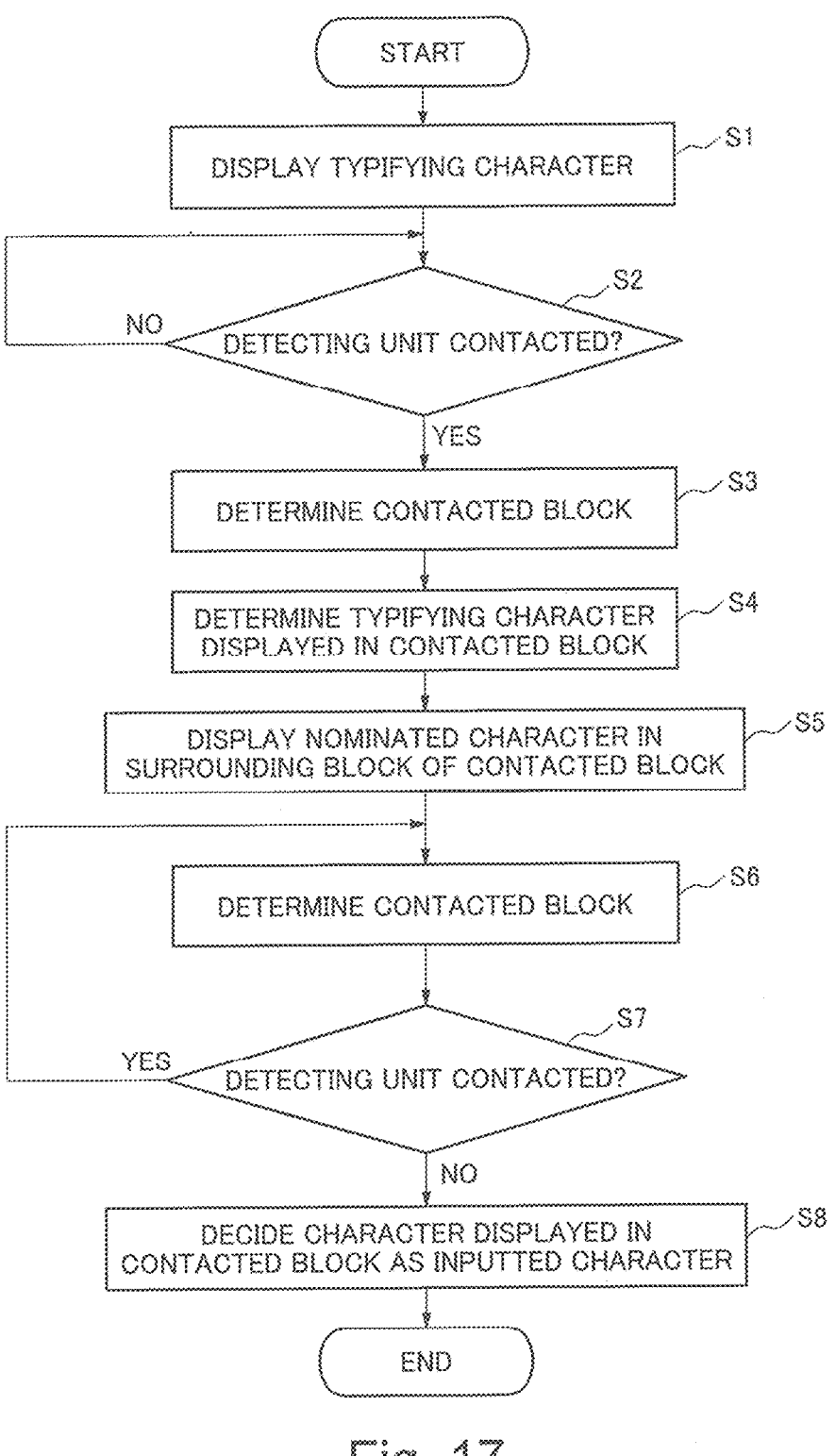
FIG. 17 is a flowchart of a program which the CPU of the information input device of the second embodiment of the invention executes.

FIG. 17 is an example of a flowchart of a program which the CPU 3 executes to control the control unit 3. Initially, the CPU 3 displays a typifying character in each display block (step S1). Next, the CPU 3 monitors the detection signal 5 and monitors presence or absence of contact with the detecting unit 2 (step S2). Detecting the contact with the detecting unit 2, the CPU 3 detects a contacted position based on the detection signal 5, and determines "contacted block" which is a display block including the contacted position (step S3). The CPU 3 determines a typifying character displayed in the contacted block (step S4). The CPU 3 displays a nominated character in "surrounding block of the contacted block" which is a display block around the contacted block (step S5). Specifically, the CPU 3 changes contents of display information signal 4 and changes the typifying character displayed in the surrounding block of the contacted block into the nominated character. Next, the CPU 3 repeats determination of the contacted block (step S6) and monitoring presence or absence of the contact with the detecting unit 2 (step S7). When the contact with the detecting unit 2 is not detected, the CPU 3 decides a character displayed in the contacted block as an inputted character (step S8).

Figure 18:
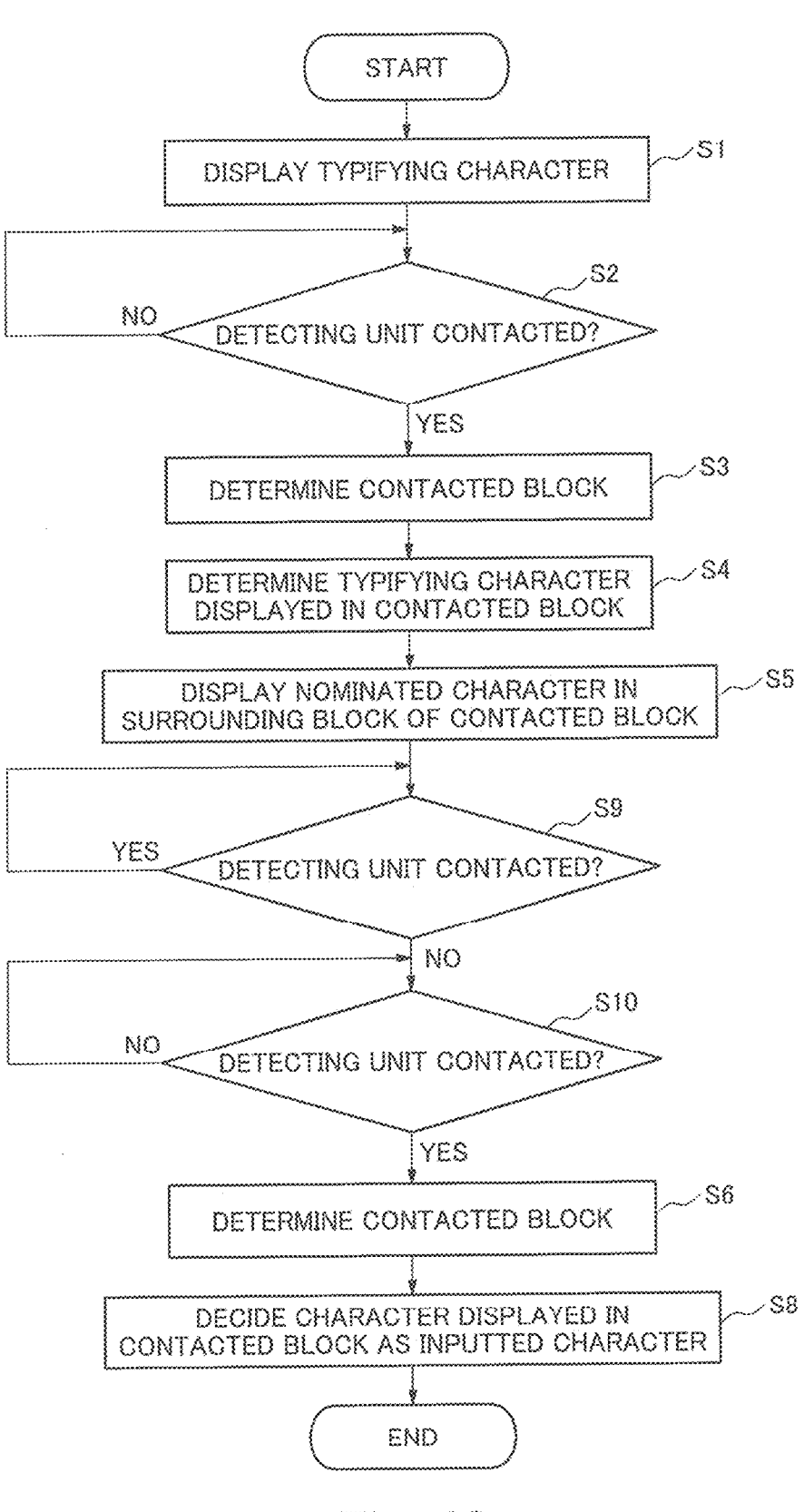
FIG. 18 is an example of a modification of the flowchart of the program which the CPU of the information input device of the second embodiment of the invention executes.

FIG. 18 is a modified example of the flowchart of the program which the CPU 3 executes to control the control unit 3. In the modified example of FIG. 18, after selecting the typifying character, a user temporarily stops contacting with the detecting unit 3, and the user contacts with the nominated character again, after the nominated character is displayed. The steps S1 to S5 are the same as the case of FIG. 17. Displaying the nominated character in the surrounding block of the contacted block (step S5), the CPU 3 monitors absence of the contact with the detecting unit 2 (step S9). When detecting absence of the contact with the detecting unit 2, and detecting presence of the contact therewith again (step S10: Yes), the CPU 3 determines the contacted block (step S6). After that, the CPU 3 decides a character which was displayed in the contacted block as an inputted character (step S8).

Figure 19:
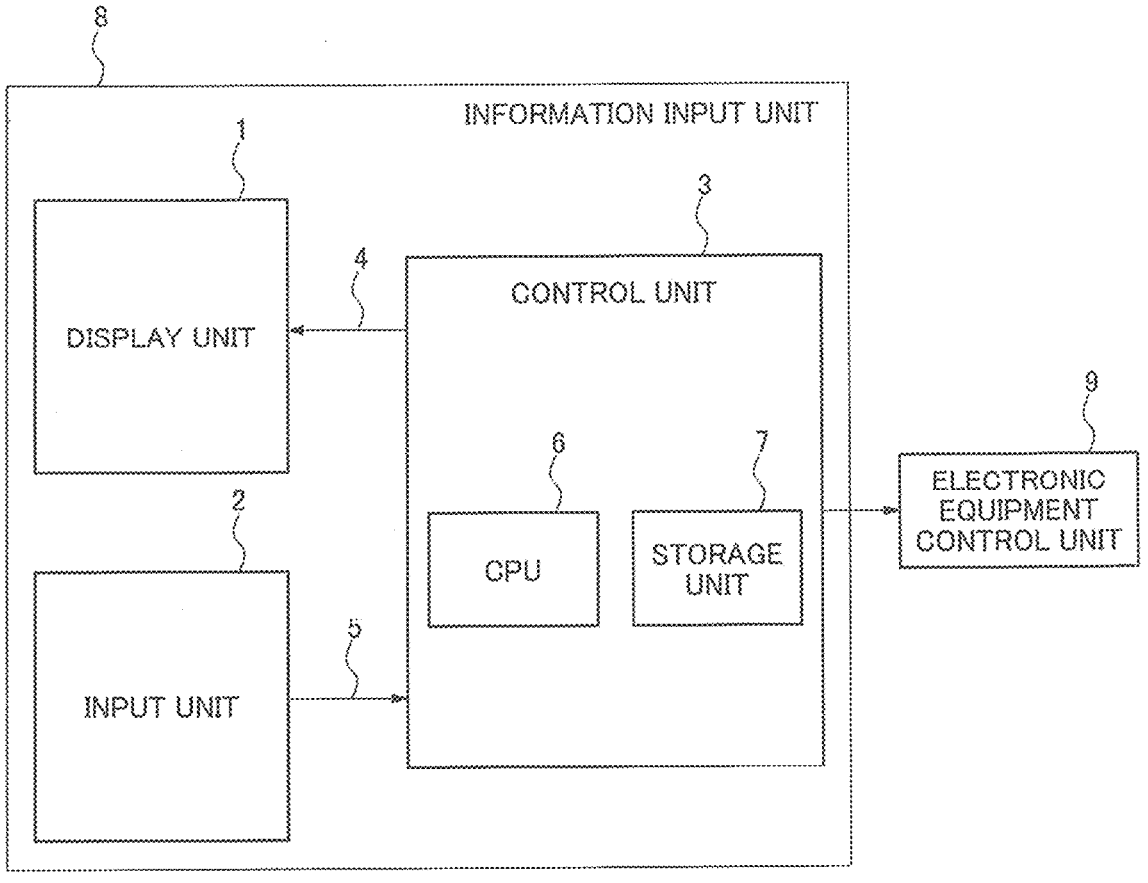
FIG. 19 is a block diagram illustrating a configuration of electronic device having the information input device of the second embodiment of the invention.

The information input device of the second embodiment may be used as an information input unit to which information is inputted from an outside, in electronic device requiring an information input function. FIG. 19 illustrates a block diagram of electronic device in which the information input device of the second embodiment is used as an information input unit. In the electronic device, information on an inputted character is transmitted from the control unit 3 included in an information input unit 8 to an electronic device control unit 9 controlling the electronic device.

Incidentally, there is no need to use a display arranged on a touch panel and on a rear face of the touch panel for input and display of a character. For example, a normal switch array which detects an input by being pushed, that is, a keyboard and the like may be used. In this case, it is necessary to arrange a display unit above each switch (key). Display contents of the display unit have only to be changed just like the method using the touch panel mentioned above.

As described above, in the information input device of the second embodiment, only the typifying character is displayed in the display unit 1 in an initial state, and when the typifying character is selected, the nominated character is displayed therearound. When selection of the typifying character shifts to selection of the nominated character, a contacted position on the detecting unit 2 has only to be shifted. Therefore, an input operation for a character can be efficiently performed.

Since the nominated character is displayed after the typifying character is selected, input for many characters can be advantageously handled even though the number of the display blocks is small.

Further, kana characters, alphabet, a number, a character string, a symbol and the like can be mixed in the typifying character. Even a sentence in which kinds of characters and the like are mixed can be inputted efficiently.

Third Embodiment

Figure 20A:
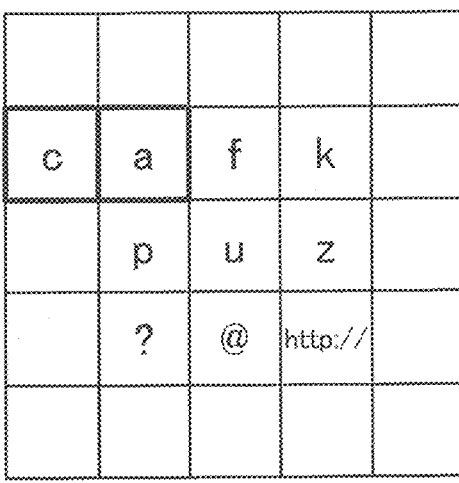
FIGS. 20A, 20B, 20C, and 20D are plain views illustrating examples of displayed contents of a third embodiment of the invention.
Figure 20B:
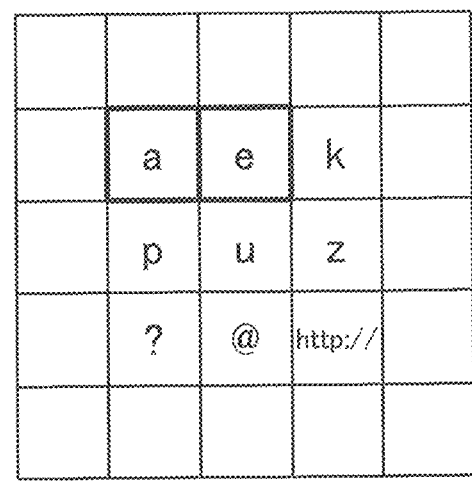
Figure 20C:
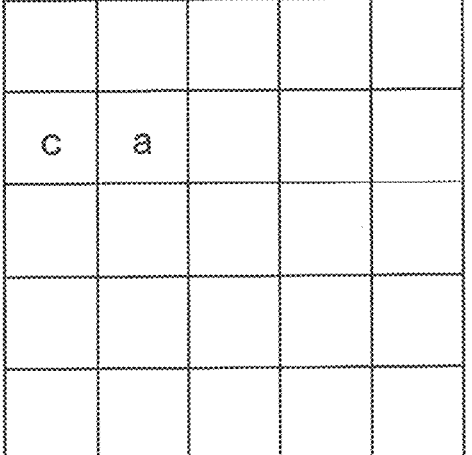
Figure 20D:
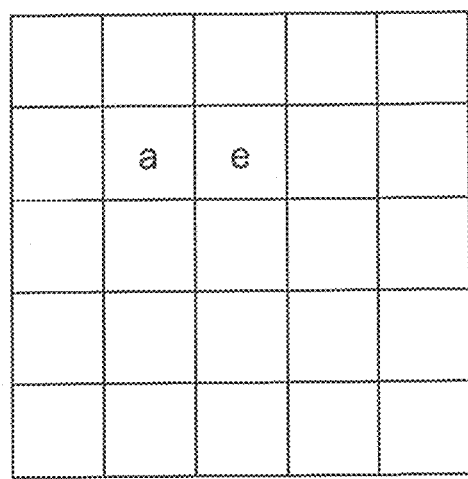

In an information input device of a third embodiment, all nominated characters are not displayed, but only nominated character to be displayed in a display position at the time is displayed, when a user moves a contacted position. It is assumed that when a typifying character is displayed as shown in FIG. 13A, a user moves the contacted position to the left, after selecting the typifying character "a," for example. Then, the nominated character "c" is displayed in a display block on the left side of "a" (FIG. 20A). In contrast, if a user moves the contacted position to the right after selecting the typifying character "a," the nominated character "e" is displayed in a display block on the left side of "a" (FIG. 20B). FIGS. 20C and 20D are display examples which are displayed when only the selected typifying character and the nominated character corresponding to the contacted position are displayed. As described above, an operation may be performed, in which according to the contacted position, the nominated character corresponding thereto is displayed.

Figure 21:
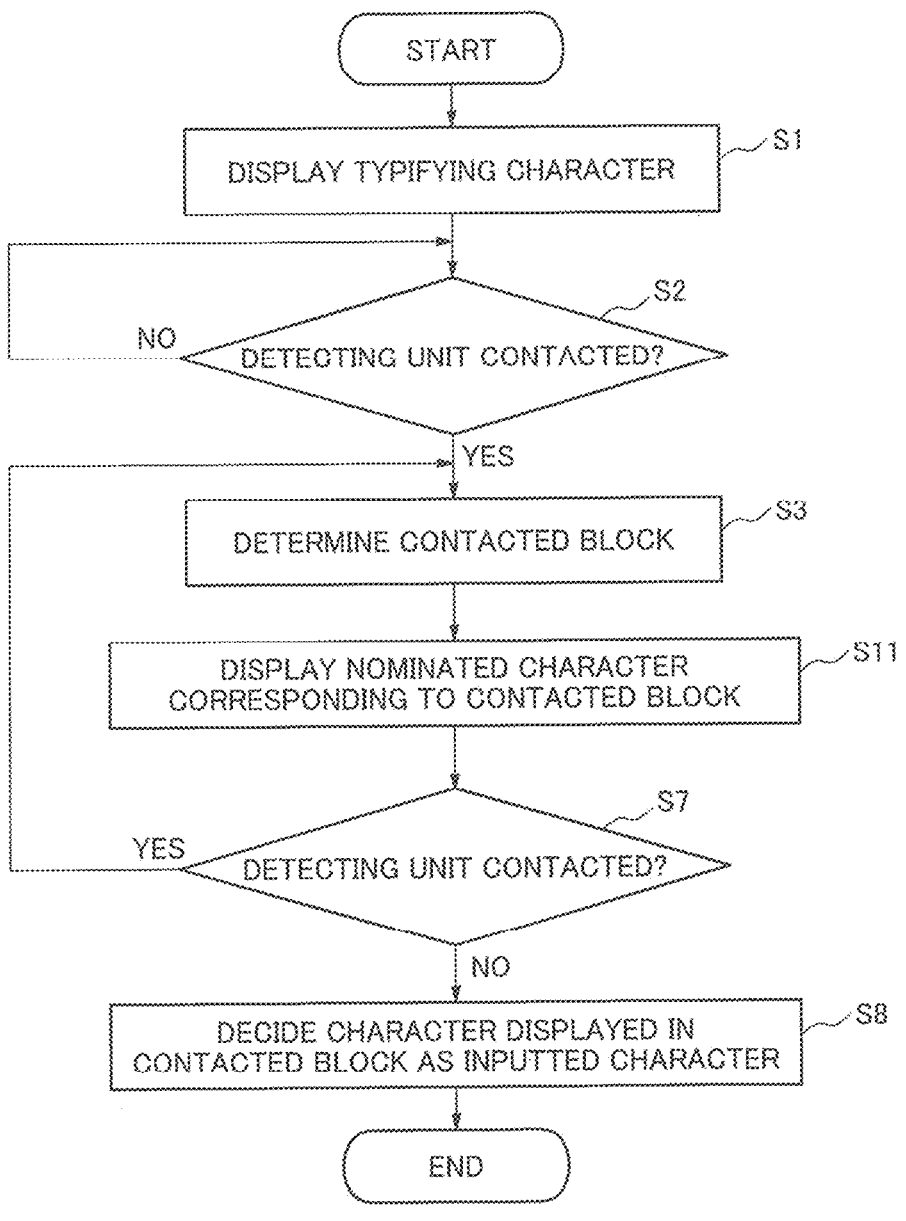
FIG. 21 is a flowchart of a program which the CPU of the information input device of the third embodiment of the invention executes.

A configuration of the third embodiment is the same as the configuration shown in FIG. 16 of the second embodiment. FIG. 21 is an example of a flowchart of a program which the CPU 3 executes when performing display control of FIGS. 20A, 20B, 20C and 20D. The steps S1 to S2 are the same as the case of FIG. 17. Detecting contact with the detecting unit 2, the CPU 3 determines a contacted block (step S3), and displays a nominated character corresponding to the contacted block (step S11). That is, the CPU 3 displays a character in only the contacted block which is contacted at the time. If the contacted block is a display block around the typifying character (the surrounding area of the contacted block), the CPU 3 displays a nominated character corresponding to the contacted block. The CPU 3 repeats monitoring absence of the contact with the detecting unit 2 (step S7). The CPU 3 repeats operations, steps S3, S11 and S7. When the contact with the detecting unit 2 disappears, the CPU 3 decides the character which was displayed in a contacted position as an inputted character (step S8).

Figure 22:
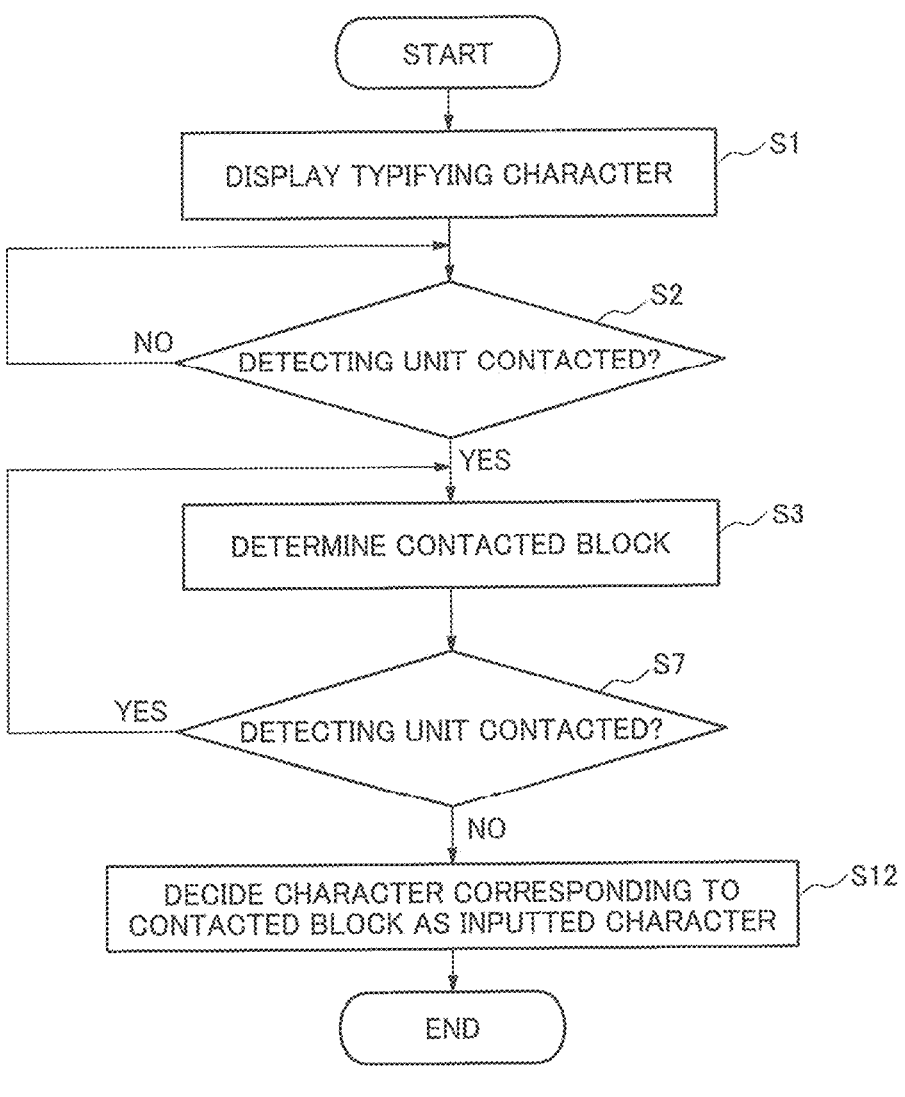
FIG. 22 is an example of a modification of the flowchart of the program which the CPU of the information input device of the third embodiment of the invention executes.

FIG. 22 is an example of a flowchart of a program which the CPU 3 executes when display of the nominated character is skipped in the method of control shown in FIG. 21. FIG. 22 is what display of the nominated character corresponding to the contacted block (step S11) is skipped in the method of control shown in FIG. 21. When contact with the detecting unit 2 disappears, the CPU 3 decides a character corresponding to the contacted block as an inputted character (step S12). In this case, if the contacted area lies in the surrounding area of the contacted block, a character allocated in the surrounding area is inputted.

In the information input method shown in FIG. 22, it is necessary to note that the inputted character is not decided by detecting a moving direction of the contacted position within the contacted area, but the character allocated to the surrounding area of the contacted block is inputted when contact occurs in the surrounding area. The information input method is a control method which is applicable to a case in which a user completely memorizes the position where the nominated character is displayed. The inputted character can be confirmed in a screen in which a character is inputted, for example, an editing screen and the like.

As described above, in the information input device of the third embodiment, only required nominated character is displayed, or display of the nominated character is skipped if display of the nominated character is not required. Since unnecessary display is not performed, change frequency of a display screen becomes decreased. Therefore, a user is not bothered with frequent change of the display screen. The information input device of the third embodiment is effective, in particular, when a user has been skillful at information input.

Fourth Embodiment

An alphabet includes a character kind related to one certain character, a character string and the like, for example, a character size, e.g. a capital letter and a small letter, a word consisting of a plurality of characters, a combination of specific characters which frequently appears, and the like. The character kind related to one certain character, the character string and the like are described below as "derivative character." An information input device of a fourth embodiment can efficiently perform input of the derivative character. Since a configuration and a method of deciding an inputted character in the information input device of the fourth embodiment is the same as the second or the third embodiment, only characteristics of displayed contents of a display unit are described below.

Figures 23A, 23B, 23C:
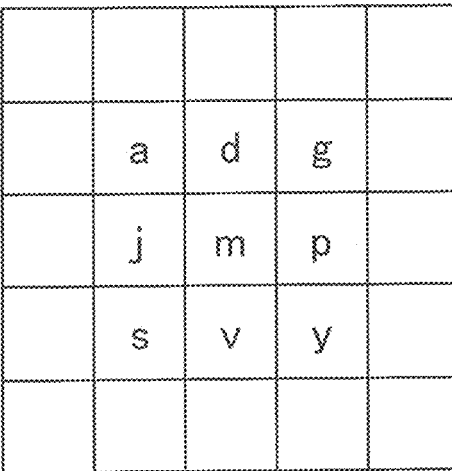
FIGS. 23A, 23B, and 23C are plain views illustrating examples of displayed contents of a fourth embodiment of the invention.

FIG. 23A illustrates a display example of a character and the like in the information input device of the fourth embodiment. In the information input device of the fourth embodiment, the display unit includes display blocks with five rows and five columns, an alphabet is grouped by four characters from "a" in order and "a," "d," "g," and the like are displayed as typifying characters. FIG. 23B illustrates a display example which is shown when the typifying character "a" is selected. When "a" is selected, a total of eight kinds of characters, small letters "b" and "c," capital letters "A," "B" and "C," frequently used character strings or words in which an initial character is "a," that is, "ar," "at," and "and" are displayed as nominated characters. Also when "s" is selected, a total of eight kinds of characters, small letters "t" and "u," capital letters "S," "T" and "U," frequently used character strings in which initial characters are "s," "t," and "u," that is, "sh," "th," and "ur" are also displayed as nominated characters. FIG. 23C illustrates a display example in the case that the typifying character "a" is selected. Regarding a character string as a nominated character, contents thereof can be optionally changed according to frequency in use. In this case, after statistics of use frequency of a given character string is collected by using the control unit 3, a character string as a nominated character may be changed according to the result thereof.

Figure 24:
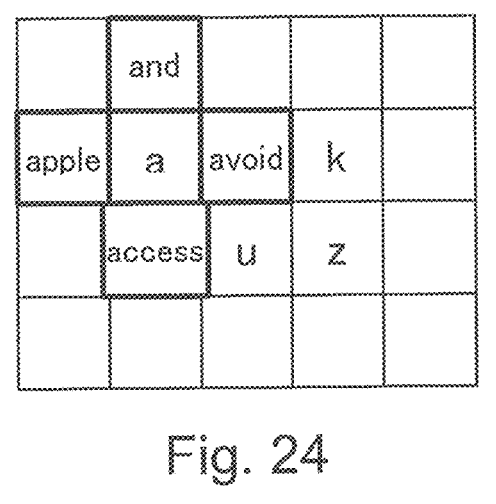

FIG. 24 illustrates a display example in the case a word, an initial character of which is a typifying character, is displayed as a nominated character. In this case, there is a method in which switch between display of the nominated character consisting of one character and display of the word is discriminated according to a length of time for pushing a display block of the typifying character. That is, when a state in which "a" is selected continues by continuing to push the display block of "a," four words each having the initial character "a" are displayed on the upper side, the lower side, the left side and the right side of the display block of "a," respectively. Or, a mode switching key and the like for switching between a single character input state and a word input state may be added. When a single character has to be inputted, that is, when a desired word, a desired character string and the like are not found in the nominated characters, a single character can be inputted by releasing a push while the typifying character displayed in a center position or a selected character is touched.

Incidentally, in FIG. 24, since a word with many characters is the nominated character, a display block size is optionally changed. As described above, since the display block size has only to be large so that the selected character and the like can be recognized, the nominated character need not to have the same size and be arranged orderly as the examples of displays shown so far. The nominated character display blocks shown in FIGS. 15B, 15C, 15D and 15E are examples in which display blocks in different shapes and with different areas are mixed. As described above, even if display blocks in different shapes and with different areas are mixed, the display block selected by being contacted is determined without problems, since a contacted position can be determined based on the detecting signal 5 from the detecting unit 2.

As a method for deciding the typifying character and the nominated character as an inputted character is the same as the second embodiment, regarding the fourth embodiment, only displayed contents thereof are described, and descriptions on detailed operations thereof are skipped.

As described above, in the information input device of the fourth embodiment, there is an advantage that a sentence, in which a capital letter and a small letter are mixed, a word frequently used and a combination of specific characters are included, can be easily inputted.

Fifth Embodiment

In an information input device of a fifth embodiment, a nominated character can become a typifying character of further different nominated characters. When a character is accompanied by various kinds of accompanying characters, or when various kinds of character strings are displayed as the nominated character, a sentence can be very efficiently inputted by dealing with the nominated character as a typifying character of further different nominated characters. A configuration and a method of deciding an inputted character of the information input device of the fifth embodiment is the same as the second or the third embodiment. Therefore, only characteristics of displayed contents of a display unit are described below.

Figure 25A:
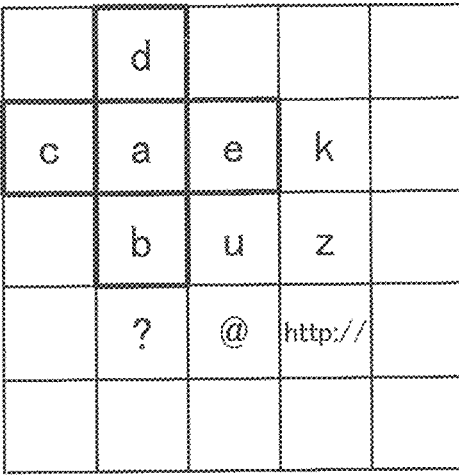
FIGS. 25A, 25B, and 25C are plain views illustrating examples of displayed contents of a fifth embodiment of the invention.
Figure 25B:
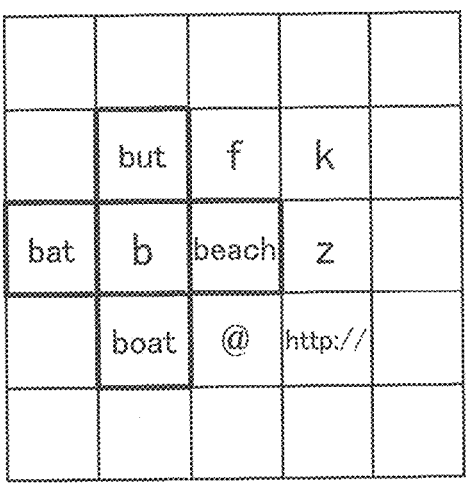
Figure 25C:
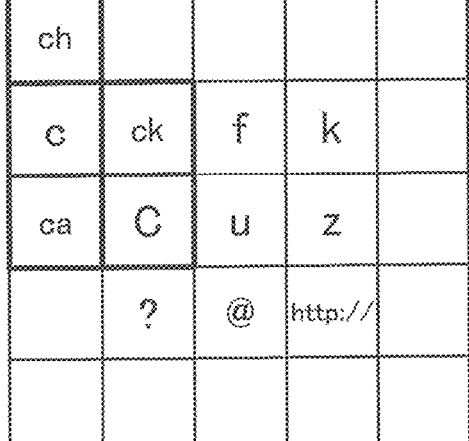

FIGS. 25B, 25C illustrate display examples in the case a nominated character becomes a typifying character of further different nominated characters. In the embodiment, "b" is a typifying character of four words, and "c" is a typifying character of four nominated characters consisting of a capital letter and character strings. If the typifying character "a" is selected in an initial state of FIG. 13A, four nominated characters "b," "c," "d," and "e" each belonging to the same group as "a" are displayed. If "b" is selected, four words are displayed around "b." Similarly, if "c" is also selected, four nominated characters consisting of a capital letter and character strings are displayed around "c."

Forty-six Japanese kana characters include a character having an accompanying character, for example, a character representing a voiced consonant of the character, small "tsu" representing a double consonant and the like, or a character string in which small characters are used in combination. Such various displays may be included as a nominated character. FIGS. 26A, 26B, 26C and 26D illustrate display examples in which "が (hereinafter referred to as "ga")" which is a derivative character of "ka ( か )," and " ぎゃ (hereinafter referred to as "kya")" and "ぎゃ (hereinafter referred to as "gya")" which are derivative expressions of "ka ( か )" are added to a nominated character, "ka ( か )." When "ka ( か )" is initially selected, four characters of "ka ( か )"-column other than "ka ( か )" and "ga ( が )" are displayed as nominated characters as shown in FIG. 26A. Further, "ga ( が )," "kya (ぎゃ)" and "gya(ぎゃ)" are typifying characters. Therefore, if "ga ( が )," "kya (ぎゃ)" or "gya (ぎゃ)" are selected, nominated characters, which these characters are typifying characters of, are displayed on the upper, lower, left and right sides in display blocks. When "ga ( が )" is selected other four characters of "ga ( が )"-column are displayed as nominated characters of "ga ( が )" as shown in FIG. 26B. When "kya ( が )" is selected, nominated characters derived from "kya (ぎゃ)" are displayed as shown in FIG. 26C. When "gya (ぎゃ)" is selected, nominated characters derived from "gya (ぎゃ)" are displayed as shown in FIG. 26D. FIG. 26E illustrates a display example in which a small "つ (hereinafter referred to as "tsu," "つ")" is added to nominated characters of "ta ( た )-column." As mentioned above, a group of a typifying character can include characters which have a predetermined relation with the typifying character. Further, a nominated character can be a typifying character of different characters.

In the above descriptions, Japanese kana character is exemplified, and an input method including derivative characters, for example, characters representing a voiced consonant, a double consonant and the like. Characters expressing a voiced consonant and a double consonant are inherent in Japanese, but the input method above described is not limited to input of Japanese character. Even if characters are those of other languages, by classifying characters into groups and defining a typifying character and a nominated character, a character input method described above can be applied.

As mentioned above, in the fifth embodiment, a nominated character can become a typifying character of different nominated characters. Therefore, even if the number of the typifying characters which is displayed in an initial state is limited, input of many characters can be efficiently performed if selecting operations are continuously carried out and nominated characters are changed in order.

Incidentally, the second embodiment through the fifth embodiment can be combined. For example, when the second and the third embodiments are combined, a method of deciding an inputted character and presence or absence of limitation of displayed nominated characters can be selected by switching modes of an information input device. Or, when the fourth and the fifth embodiments are combined, various characters, character strings, symbols and the like can be mixed as a typifying character or a nominated character. Further different kinds of combinations are available.

Sixth Through Eighth Embodiments

An electronic device of a sixth embodiment of the invention includes a touch panel for character input and inputted character deciding means. The touch panel is divided into predetermined character input boxes. Each character of "a ( あ )-row" in forty-six Japanese kana characters is allocated into each of predetermined character input boxes and is displayed. When any one of the character input boxes in which each character of "a ( あ )-row" is displayed is pushed, other characters of the "column," in which a character displayed in the pushed character input box is included, are displayed in character input boxes adjacent to the pushed character input box, in spite of presence or absence of a character which is already displayed. When a push is released after the character input box is pushed, the inputted character deciding means decides, as an inputted character, a character which is displayed in the character input box which had been pushed just before the release.

The inputted character deciding means may fix a relative position relation of each character displayed in a character input box adjacent to the character input box to a character displayed in the pushed character input box according to a kind of a vowel of each character, and display each character displayed in the character input box.

The inputted character deciding means can fix a relative position relation of each character displayed in character input boxes adjacent to the upper side, the lower side, the left side, the right side of the character input box to a character displayed in the pushed character input box according to a kind of a vowel of each character, and display each character displayed in the character input boxes.

The inputted character deciding means can fix a relative position relation of each character displayed in character input boxes adjacent to the upper left side, the lower left side, the upper right side, the lower right side of the character input box to a character displayed in the pushed character input box according to a kind of a vowel of each character, and display each character displayed in the character input boxes.

The inputted character deciding means may include a position relation setting unit for optionally setting a relative position relation between a character displayed in the pushed character input box and each character displayed in a character input box adjacent to the character input box according to a kind of a vowel of each character.

A seventh embodiment of the invention is electronic device including a touch panel for information input which is separated by a predetermined number of information input boxes. The electronic device includes inputted information deciding means which allocate plural pieces of information into predetermined information input boxes and display them, display sub information associating with information displayed in a pushed information input box in an information input box adjacent to the pushed information input box, in spite of presence or absence of already displayed information, when any one of information input boxes in which each information is displayed is pushed, and decide, when a push is released after the push, as inputted information, information or sub information which are displayed in the information input box pushed just before release of the push.

An eighth embodiment of the invention is information input method which is used in electronic device including a touch panel for information input which is separated by a predetermined number of information input boxes. In the information input method, plural pieces of information are allocated into predetermined information input boxes and are displayed, sub information associating with information displayed in a pushed information input box is displayed in an information input box adjacent to the pushed information input box, in spite of presence or absence of already displayed information, when any one of information input boxes in which each information is displayed is pushed, and information or sub information which are displayed in the information input box pushed just before release of the push is decided, as inputted information, when the push is released after the push.

In the kana character input device described in Patent document 1, one character is selected according to a selecting operation of keys and moving directions from front to back and from side to side of an operation point or an operation force after the selection. In the fifth and the sixth embodiment, detection of the moving directions from front to back and from side to side of the operation point or the operation force is not performed. Therefore, the sixth to the eighth embodiments differ from the character input device of Patent document 1 in configuration and in processing method.

In the method for inputting kana character described in Patent document 2, by touching one character in displayed characters which line up longitudinally including one character in the transverse line, the touched one character is inputted. In the fifth and the sixth embodiment, displayed characters which line up longitudinally including one character in the transverse line are not shown. Therefore, the sixth to the eighth embodiments differ from the method for inputting kana character of Patent document 2 in configuration and in processing method.

In the character input device described in Patent document 3, direction detecting of selection operation on hiragana input keys is carried out, and a character is inputted. In the fifth and the sixth embodiment, the direction detecting of selection operation is not carried out. Therefore, the sixth to the eighth embodiments differ from the method for inputting kana character of Patent document 3 in configuration and in processing method.

In the method for inputting a character described in Patent document 4, signals corresponding to five characters which are inputted by each numerical keypad and include a character of "a (あ)-row" inputted from a front face, and characters of "i (い)-row," "u (う)-row," "e (え)-row" and "o (お)-row" inputted from upper, lower, left and right directions, respectively, are outputted. In the fifth and the sixth embodiment, character selection corresponding to inputted directions is not performed. Therefore, the sixth to the eighth embodiments differ from the method for inputting a character of Patent document 4 in configuration and in processing method.

In the method for inputting a character described in Patent document 5, a character typifying the "column" is initially selected, all characters in the column are displayed transversely or longitudinally, and then a character is selected in characters displayed in line. In the fifth and the sixth embodiment, display in line transversely or longitudinally is not performed. Therefore, the sixth to the eighth embodiments differ from the method for inputting a character of Patent document 5 in configuration and in processing method.

In the sixth through the eighth embodiments, for example, the following advantages are obtained. That is, plural pieces of information are allocated to each information input box and are displayed, by inputted information deciding means. Sub information associating with information displayed in a pushed information input box is displayed in an information input box adjacent to the pushed information input box, in spite of presence or absence of already displayed information, when any one of the information input boxes in which each of information is displayed is pushed. Furthermore, when the push is released after the push, information or sub information which is displayed in the information input box pushed just before the release is decided, as inputted information. Therefore, in only small area consisting of the information input box which is pushed on ahead and the adjacent information input boxes, information input can be correctly performed.

The invention can be applied to electronic device having a touch panel for inputting information and a character or a keyboard, in addition to a mobile phone, a PDA and the like. The invention is particularly effective for mobile device in which a size of a character display unit and an inputted character is limited, and the like.

While having described an invention of the present application referring to the embodiments, the invention of the present application is not limited to the above mentioned embodiments. It is to be understood that to the configurations and details of the invention of the present application, various changes can be made within the scope of the invention of the present application by those skilled in the art.

This application claims priority from Japanese Patent Application No. 2008-003393 filed on Jan. 10, 2008, the contents of which are incorporated herein by reference in their entirety.

What is claimed is:

1. An information input device comprising:

a display comprising a touch panel configured to detect a plurality of touch inputs to the touch panel; and at least one processor and a computer-readable memory storing program instructions that cause the at least one processor to:

display, by the display, a plurality of first Japanese characters arranged in rows and columns;

detect that a first touch input of the plurality of touch inputs has been made to the touch panel;

detect, based on detecting that the first touch input has been made to the touch panel, a contacted position of the touch panel at which the first touch input has been made to the touch panel;

identify, based on detecting the contacted position, a first Japanese character of the plurality of first Japanese characters, wherein the first Japanese character is displayed by the display and at the contacted position of the touch panel;

determine, based on identifying the first Japanese character, second Japanese characters; and display, by the display, both a highlighted style of the first Japanese character and also the second Japanese characters, the second Japanese characters being displayed at second positions of the display;

wherein the second positions are adjacent to the contacted position, wherein a second Japanese character of the second Japanese characters is displayed at a second position of the plurality of second positions, wherein the first Japanese character represents a first consonant and a first vowel, wherein the second Japanese character represents a second consonant and a second vowel, the second consonant being the same as the first consonant, and the second vowel being different from the first vowel, and wherein based on detecting a second touch input to the touch panel and at the second position, a highlighted style of the second Japanese characters is displayed by the display.

2. The information input device according to claim 1, wherein the program instructions further cause the at least one processor to display, based on the second vowel of the second Japanese character, the second Japanese character at the second position.

3. The information input device according to claim 1, wherein the program instructions further cause the at least one processor to, in response to detecting a release of the second touch input and after displaying the highlighted style of the second Japanese character, determine the second Japanese character as an inputted Japanese character.

4. The information input device according to claim 1, wherein the first vowel is "a", and wherein the second vowel is one of "i", "u", "e", and "o".

5. An information input method comprising:

displaying, by a display, a plurality of first Japanese characters arranged in rows and columns;

detecting that a first touch input of the plurality of touch inputs has been made to a touch panel of the display;

detecting, based on detecting that the first touch input has been made to the touch panel, a contacted position of the touch panel at which the first touch input has been made to the touch panel;

identifying, based on detecting the contacted position, a first Japanese character of the plurality of first Japanese characters, wherein the first Japanese character is displayed by the display and at the contacted position of the touch panel;

determining, based on identifying the first Japanese character, second Japanese characters; and displaying, by the display, both a highlighted style of the first Japanese character and also the second Japanese characters, the second Japanese characters being displayed at second positions of the display, wherein one or more of the second positions are adjacent to the contacted position, wherein a second Japanese character of the second Japanese characters is displayed at a second position of the plurality of second positions, wherein the first Japanese character represents a first consonant and a first vowel, wherein the second Japanese character represents a second consonant and a second vowel, the second consonant being the same as the first consonant, and the second vowel being different from the first vowel, and wherein based on detecting a second touch input to the touch panel and at the second position, a highlighted style of the second Japanese character is displayed by the display.

6. The information input method according to claim 5, wherein the program instructions further cause the at least one processor to display, based on the second vowel of the second Japanese character, the second Japanese character at the second position.

7. The information input method according to claim 5, further comprising, in response to detecting a release of the second touch input and after displaying the highlighted style of the second Japanese character, determining the second Japanese character as an inputted Japanese character.

8. The information input method according to claim 5, wherein the first vowel is "a", wherein the second vowel is one of "i", "u", "e", and "o".

9. An information input method comprising:

displaying a plurality of first characters arranged in rows and columns;

detecting whether a physical contact from an outside has been made, and detecting a contacted position when the physical contact is made;

identifying a first character of the plurality of first characters, wherein the identified first character is displayed at a position corresponding to the contacted position;

determining at least one second position overlapping at least one adjacent position in the arranged rows and columns, wherein the at least one adjacent position is adjacent to the position at which the identified first character is displayed;

deciding second characters based on a kind of the identified first character;

displaying, along with the display of the identified first character corresponding to the contacted position, one or more of the second characters in the at least one second position, respectively;

inputting information based on the contacted position, and the first characters and the second characters are Japanese characters.

10. The information input device according to claim 9, wherein a relative position of a position at which the second character to be displayed to a position at which the first character is displayed is decided by a vowel of the second character.

11. The information input device according to claim 10, further comprising: a setting unit in which the relative position is set.

12. The information input device according to claim 9, wherein the control unit inputs the information based on the character which had been displayed at the position nearest to the contacted position at a time just before when the detecting unit detects the contact is released.

13. The information input device according to claim 9, wherein the control unit inputs the information based on the character which had been displayed at a position nearest to the final contacted position, if the detecting unit detects the contact exists at plurality positions.

14. The information input device according to claim 9, wherein the display unit is divided into a plurality of display blocks, and the control unit decides the first character displayed in each of the plurality of display blocks, and then determines the first character displayed in a block nearest to the contacted position based on the contacted position if the detecting unit detect the contact exists, and decides the second character displayed in a display block adjacent to the display block in which the first character is displayed based on a kind of the first character.

15. The information input device according to claim 9, further comprising:

a display comprising a touch panel configured to detect a touch; and at least one processor and a computer-readable memory storing program instructions that cause the at least one processor to implement the detecting unit and the control unit, and wherein the display unit is implemented by the display.

16. The information input device according to claim 15, wherein directing the display unit to display, along with the display of the identified first character corresponding to the contacted position, the one or more of the second characters in the at least one second position, respectively, comprises directing the display unit to display a highlighted style of the identified first character.

17. The information input device according to claim 16, wherein the identified first character represents a first consonant and a first vowel, wherein each the second characters represents a second consonant and a second vowel, the second consonant being the same as the first consonant, the second vowel being different from the first vowel, wherein one of the second characters is displayed above the identified first Japanese character, and wherein when the physical contact is detected above the contacted position, the one of the second Japanese characters is displayed in the highlighted style.

* * * * *